US012118006B2

(12) United States Patent
Bangalore et al.

(10) Patent No.: US 12,118,006 B2
(45) Date of Patent: Oct. 15, 2024

(54) AUTOMATED CODE GENERATION FOR COMPUTER SOFTWARE

(71) Applicant: Microsoft Technology Licensing, LLC, Redmond, WA (US)

(72) Inventors: Kiran Kumar Govindaraju Bangalore, Bangalore (IN); Ashis Kumar Roy, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/317,550

(22) Filed: May 11, 2021

(65) Prior Publication Data

US 2022/0245153 A1   Aug. 4, 2022

(30) Foreign Application Priority Data

Jan. 29, 2021   (IN) .............................. 202141003978

(51) Int. Cl.
*G06F 16/2455*   (2019.01)
*G06F 16/242*   (2019.01)
*G06F 16/2457*   (2019.01)

(52) U.S. Cl.
CPC .... *G06F 16/24564* (2019.01); *G06F 16/2425* (2019.01); *G06F 16/2445* (2019.01); *G06F 16/2457* (2019.01)

(58) Field of Classification Search
CPC ........... G06F 16/24564; G06F 16/2425; G06F 16/2445; G06F 16/2457
See application file for complete search history.

(56) References Cited

U.S. PATENT DOCUMENTS

| 6,681,221 | B1 | 1/2004 | Jacobs |
| 10,489,462 | B1* | 11/2019 | Rogynskyy ........... H04L 43/026 |
| 2005/0120027 | A1 | 6/2005 | Ter |
| 2009/0043762 | A1 | 2/2009 | Shiverick et al. |

(Continued)

FOREIGN PATENT DOCUMENTS

WO   WO-2019055553 A1 *   3/2019   ............... G01V 3/36

OTHER PUBLICATIONS

"Understanding the User Interface", Retrieved From: https://help.sap.com/saphelp_me60/helpdata/DE/87/bd5c5b6ab34a4f93c134a5fa153db1/content.htm?no_cache=true#:~:text=The%20BRFplus%20user%20interface%20(UI,objects%20available%20in%20a%20system, Retrieved On: Feb. 11, 2021, pp. 1-4.

(Continued)

*Primary Examiner* — Mark D Featherstone
*Assistant Examiner* — Ranjit P Doraiswamy
(74) *Attorney, Agent, or Firm* — MANNAVA & KANG, P.C.

(57) ABSTRACT

An automatic rule generation and evaluation system enables a user to generate rules and evaluate the rules even as the rules are generated. The user employs a rules workbench user interface (UI) to provide input regarding the rules to be implemented on data obtained from a plurality of data sources. The rules workbench UI generates scripts from the user input. The scripts are employed to build a model and generate queries. Displaying the result sets obtained from executing the queries enables the user to evaluate the rules in real-time. If the user is satisfied, the user may finalize the rules, else the user can further modify the rules and the steps of rule modification and rule evaluation may be iterated until the rules are finalized.

20 Claims, 21 Drawing Sheets

(56) References Cited

U.S. PATENT DOCUMENTS

| | | |
|---|---|---|
| 2009/0077360 A1 | 3/2009 | Liu et al. |
| 2010/0161651 A1 | 6/2010 | Cras |
| 2011/0202378 A1 | 8/2011 | Rabstejnek et al. |
| 2012/0323956 A1* | 12/2012 | Dumitru ............ G06F 16/2471 |
| | | 707/769 |
| 2013/0332449 A1 | 12/2013 | Amos et al. |
| 2014/0074888 A1 | 3/2014 | Potter et al. |
| 2019/0073388 A1* | 3/2019 | Desmarets ............ G06F 16/212 |
| 2020/0279200 A1* | 9/2020 | Makhija .................. G06K 9/62 |

OTHER PUBLICATIONS

Singh, Gagandeep, "Automatic Airflow DAG creation for Data Scientists and Analysts", Retrieved From: https://towardsdatascience.com/automatic-airflow-dag-creation-for-data-scientists-and-analysts-17d24a9884ba, Jan. 21, 2020, pp. 1-8.

Zhao, et al., "Towards Computer-Aided Multiscale Modelling: A Generic Supporting Environment for Model Realization and Execution", In Journal of Computers & Chemical Engineering, vol. 40, May 11, 2012, pp. 1-33.

"International Search Report and Written opinion Issued in PCT Application No. PCT/US22/012387", Mailed Date: May 10, 2022, 12 Pages.

* cited by examiner

```
{
    ~1002
    "Id": "WindowsVD_DataPrep",                                                      1000
    "sources": [  ~1004
    {
        "dataSourceId": 1,
        "sourceType": {
            "type": "table",
            "tableName": "[pi].[modernazureusagewithvorg]",
            "alias": "wvd"
        },
        "persist": false,
        "projections": "wvd.vOrgMpnId, wvd.AccountId, wvd.CustomerTenantId",
        "measures": "SUM(AzureConsumedRevenueCD)/3.0 AS MonthlyAvgWVD_ACR",
        "measureFilter": "SUM(AzureConsumedRevenueCD)/ 3.0 > 2000",
        "rowFilter": "wvd.Dim_DateId >= 20200501 AND wvd.Dim_DateId <= 20200701 AND wvd.ServiceInfluencer='NATIVE WVD' AND isDuplicateatvorglevel=0",
        "rowOrder": "wvd.AccountId DESC"
    },
    {□},
    {□},
    {□},
    {
        "dataSourceId": 8,
        "persist": true,
        "destination": "[mpn].[WVD_DatasetForRules]",
        "projections": "acr.vOrgMpnId, acr.AccountId, acr.CustomerMeetingNativeWVDACRThreshold,
                        tc.UserCount, cert.MCPCount, cert.SkillCount, PC.CompetencyName,
                        PC.CompetencyLevel, PC.ActivationStatus"
    }
    ],
    "relations": [  ~1006
    {
        "from": "2",
        "to": "1"
    },
    {□},
    {□},
    {□},
    {□},
    {□}
    ],
    "joins": [  ~1008
    {
        "type": "INNER",
        "first": "2",
        "second": "3",
        "condition": "acr.AccountId = PC.AccountId"
    },
    {□},
    {□}
    ]
}
```

*FIG. 10A*

```
{
  "id": "NativeWindowsVirtualDesktopASP",
  "Description": "This json contains rules for evaluating the pre-qualification criteria for Native Windows Virtual Desktop Program",
  "Rules": {
    "Conditions": {  ←—1052
      "Name": "R1",
      "Expression": "((CustomersMeetingNativeWVDACRThreshold >= 1) or (PartnerACRCheckOverrideEndDate IS NOT NULL))",
      "ValueIfTrue": "success",
      "ValueIfFalse": "fail",
      "ScoreAs": "PartnerACRCheck",
    }
    ☐☐   ←—1054
    ☐☐
  },
  "OverallRule": {
    "Name": "Final",
    "Expression": "((PartnerIsGoldStatusInCloudPlatformCompetency = 'success' AND PartnerACRCheck = 'success' AND PartnerCertifiedIndividualCountCheck = 'success'))",
    "ValueIfTrue": "success",
    "ValueIfFalse": "fail",
    "StoreAs": "status"
  }
}
```

*FIG. 10B*

```
{
  "Id":"Bradley_DataPrep",
  "Duration" : "3",
  "sources": [                                        1100
    {
      "dataSourceId": 1,
      "sourceType": {"type":"Contained", "location":"DW", "tableName":"AccountDetails", "alias":"ad"},
      "persist": false,
      "makeDistinct":false,
      "projections": "ad.vOrgMpnId, ad.AccountId",
      "rowFilter" : "ad.CompanyName NOT LIKE 'Test_Test%'"     —1101
    },
    ...
    {
      "dataSourceId": 14,
      "sourceType": {"type":"Parent", "alias":"ov"},
      "persist": false,
      "makeDistinct":true,
      "projections": "p1.vOrgMpnId, CASE WHEN ov.mpnId IS NULL THEN 0 ELSE 1 END AS
OverrideSet, ISNULL(comp.IsMPNActive, 0) AS IsActiveMPN, ISNULL(comp.CompetencyMet, 0)
AS CompetencyMet, ISNULL(agg.AgreementMet,0) AS  AgreementSigned"
    }
  ],
  "relations":[
    {"from" : "8", "to": "3"},
    {"from" : "8", "to": "4"},
    {"from" : "9", "to": "3"},
    {"from" : "9", "to": "5"},
    {"from" : "11", "to": "1"},
    {"from" : "11", "to": "2"},
    {"from" : "12", "to": "8"},    —1102
    {"from" : "12", "to": "9"},
    {"from" : "13", "to": "6"},
    {"from" : "13", "to": "7"},
    {"from" : "14", "to": "10"},
    {"from" : "14", "to": "11"},
    {"from" : "14", "to": "12"},
    {"from" : "14", "to": "13"}                                      1103
  ],
  "joins": [
    {"type" : "INNER", "first": "1", "second": "2", "condition": "mpn.AccountId = ad.AccountId"},
    {"type" : "INNER", "first": "3", "second": "4", "condition": "enr.AccountId = ad.AccountId"},
    {"type" : "INNER", "first": "3", "second": "5", "condition": "ad.AccountMpnId = mt.mpnId"},
    {"type" : "INNER", "first": "6", "second": "7", "condition": "pp.ProgramPeriodName =
po.programPeriodCode"},
    {"type" : "LEFT OUTER", "first": "10", "second": "11", "condition": "p1.vOrgMpnId =
comp.vOrgMpnId"},
    {"type" : "LEFT OUTER", "first": "10", "second": "12", "condition": "p1.vOrgMpnId =
agg.vOrgMpnId"},
    {"type" : "LEFT OUTER", "first": "10", "second": "13", "condition": "ov.mpnId = p1.mpnId"}
  ],
  "unions": [
    {"parent": 12, "children": [8,9]}
  ]
}
```

```sql
SELECT top 10 ad.accountid, mpnId, ad.vOrgMpnId, ad.accounttype, OverrideSet,
IsActiveMPN, CompetencyMet, AgreementSigned--, COUNT(*) As MPNCount
FROM
[Account].[AccountDetails] ad
INNER JOIN
(
SELECT DISTINCT
        p1.mpnId,
        p1.vOrgMpnId,
        p1.SubsidiaryId,
        p1.SubsidiaryName,
        p1.CountryCode,
        CASE
                WHEN ov.mpnId IS NULL THEN 0
                ELSE 1
        END AS  OverrideSet,
        ISNULL(comp.IsMPNActive, 0) AS IsActiveMPN,
        ISNULL(comp.CompetencyMet, 0) AS CompetencyMet,
        ISNULL(agg.AgreementMet,0) AS  AgreementSigned
FROM
...

LEFT OUTER JOIN
(
        SELECT DISTINCT
                ac.vOrgMpnId,
                ac.AccountMpnId AS mpnId,
                1 AS CompetencyMet,
                IsMPNActive
        FROM [Account].[AccountDetails] ac
        INNER JOIN
        (
                SELECT
                        ad.vOrgMpnId,
                        CASE WHEN mpn.ActivationStatus = 'Active' THEN 1 ELSE 0
END AS IsMPNActive
                        FROM [Account].[AccountDetails] ad
                        INNER JOIN [mpn].[PCActiveCompetencies] mpn ON mpn.AccountId = ad.AccountId
                        WHERE mpn.CompetencyLevel IN ('Gold', 'Silver')
                        AND CompetencyName IN ('CloudBusinessApplications',
'CloudCustomerRelationshipManagement', 'CloudPlatform', 'CloudProductivity', 'DataAnalytics', 'DataPlatform', 'EnterpriseMobilityManagement', 'ISV', 'SmallMidmarketCloudSolutions', 'WindowsAndDevices', 'EnterpriseResourcePlanning')
                        AND ad.CompanyName NOT LIKE 'Test_Test%'
        ) cmp ON cmp.vOrgMpnId = ac.vOrgMpnId
        WHERE ac.CompanyName NOT LIKE 'Test_Test%'
) comp ON p1.mpnId = comp.mpnId AND p1.vOrgMpnId = comp.vOrgMpnId
...
```

FIG. 11B

MICROSOFT PARTNER CENTER: FABRIKAM    SEARCH

- HOME
- INTERNAL TOOLS
  - MPN
    - FIRST PARTY
    - INCENTIVES
    - CASE REVIEWS
    - TAX WITHHOLDING

IUA MPN PROGRAM CONFIGURATION

NEW

| [+] CREATE NEW PROGRAM | AZURE PROGRAM MMXX<br>ADVANCED SPECIALIZATION<br>OWNER: KIRAN BANGALORE<br>COPY AS TEMPLATE | TEAMS PROGRAM MMXX<br>COMPETENCY<br>OWNER: VIVEK MOHAN<br>COPY AS TEMPLATE | O365 PROGRAM MMXX<br>ADVANCED SPECIALIZATION<br>OWNER: KIRAN BANGALORE<br>IN DRAFT |
|---|---|---|---|

PROGRAMS LIST

| PROGRAM NAME | PROGRAM TYPE | CREATED BY | OWNER | TIERS INCLUDED | CREATED | ACTIONS ↑ |
|---|---|---|---|---|---|---|
| AZURE PROGRAM MMXX | ADVANCED SPECIALIZATION | KIRAN BANGALORE | KIRAN BANGALORE | 2 | 2 DAYS AGO | IN DRAFT |
| O365 PROGRAM MMXX | COMPETENCY | VIVEK MOHAN | KIRAN BANGALORE | NA | 1/1/20 | IN DRAFT |
| TEAMS PROGRAM MMXX | ADVANCED SPECIALIZATION | VIVEK MOHAN | KIRAN BANGALORE | NA | 1/1/20 | COPY AS TEMPLATE |
| M365 PROGRAM MMXX | ADVANCED SPECIALIZATION | VIVEK MOHAN | KIRAN BANGALORE | 3 | 1/1/20 | COPY AS TEMPLATE |
| WINDOWS PROGRAM MMXX | COMPETENCY | VIVEK MOHAN | KIRAN BANGALORE | NA | 1/1/20 | COPY AS TEMPLATE |
| AZURE PROGRAM MMXX_1 | ADVANCED SPECIALIZATION | VIVEK MOHAN | KIRAN BANGALORE | 1 | 1/1/20 | COPY AS TEMPLATE |
| TEAMS PROGRAM MMXX_2 | ADVANCED SPECIALIZATION | VIVEK MOHAN | KIRAN BANGALORE | 2 | 1/1/20 | COPY AS TEMPLATE |
| O365 PROGRAM MMXX_2 | COMPETENCY | VIVEK MOHAN | KIRAN BANGALORE | NA | 1/1/20 | COPY AS TEMPLATE |

FIG. 15

IUA MPN PROGRAM CONFIGURATION

PROGRAM DETAILS                                                  EDIT

| | | |
|---|---|---|
| PROGRAM NAME MEETINGS AND MEETING ROOMS FOR MICROSOFT TEAMS | PROGRAM TYPE ADVANCED SPECIALIZATION | PROGRAM DESIGN ENROLLMENT ONLY |
| SPONSORING BUSINESS GROUP MICROSOFT TEAMS | PROGRAM OWNER NAME KIERAN BANGALORE | STEPS REQUIRED PRE-QUALIFICATION, APPLICATION (OPTIONAL), AUDIT (OPTIONAL) |
| TIERS INCLUDED NA | | |

REQUIREMENTS CONFIGURATION
IUA SELECT DATA SOURCES AND ADJUST THEIR THRESHOLDS. MANAGE EACH TIER AND SHOW THE PROGRESSION.

ELIGIBILITY   PERFORMANCE   KNOWLEDGE   CUSTOMER REFERENCES

REQUIRED COMPETENCY
COMPETENCY
CLOUD PLATFORM ▾
COMPETENCY LEVEL
○ NA  ◉ SILVER  ○ GOLD

REQUIRED PROGRAM
PROGRAM
COMMERCIAL MARKETPLACE PUBLISHER PROGR... ▾

PARTNER ELIGIBILITY STATS
BRIEF VIEW OF PARTNERS QUALIFYING FOR CONFIGURED REQUIREMENTS
ELIGIBILITY
GOLD MICROSOFT PARTNERS WITH CLOUD PLATFORM COMPETENCY
53,481

53.4%
0 — 100,000
53,481 PARTNERS QUALIFIED — 1702

Sidebar: HOME, INTERNAL TOOLS, MPN, FIRST PARTY, INCENTIVES, CASE REVIEWS, TAX WITHOLDING

AUTOMATED CODE GENERATION FOR COMPUTER SOFTWARE

PRIORITY

This application claims priority to Indian provisional patent application serial no. 202141003978, entitled "AUTOMATED QUERY GENERATION AND RESULT EVALUATION", filed on Jan. 29, 2021, the entirety of which is incorporated herein by reference.

BACKGROUND

Companies often utilize software that is customized to their particular requirements. However, the requirements may change, and as a result, the software must be changed to accommodate the new requirements. Creating new software or modifying existing software often requires an in-depth analysis of the requirements and the benefits. Furthermore, from a coding standpoint, every time the business decides to change a particular requirement that is coded in the software, the engineering team has to make code changes to enable the new requirement and to test the accuracy. It may take a few months to implement the new requirement in the software, including making code changes across the stack from the UI layer to a data access layer.

BRIEF DESCRIPTION OF DRAWINGS

Features of the present disclosure are illustrated by way of examples shown in the following figures. In the following figures, like numerals indicate like elements, in which:

FIGS. 10A-B show examples JSON scripts for generating a data source query and a rule query.

FIGS. 11A-B show examples of a data source script and a data source query generated from the data source script.

2

Figure 13:
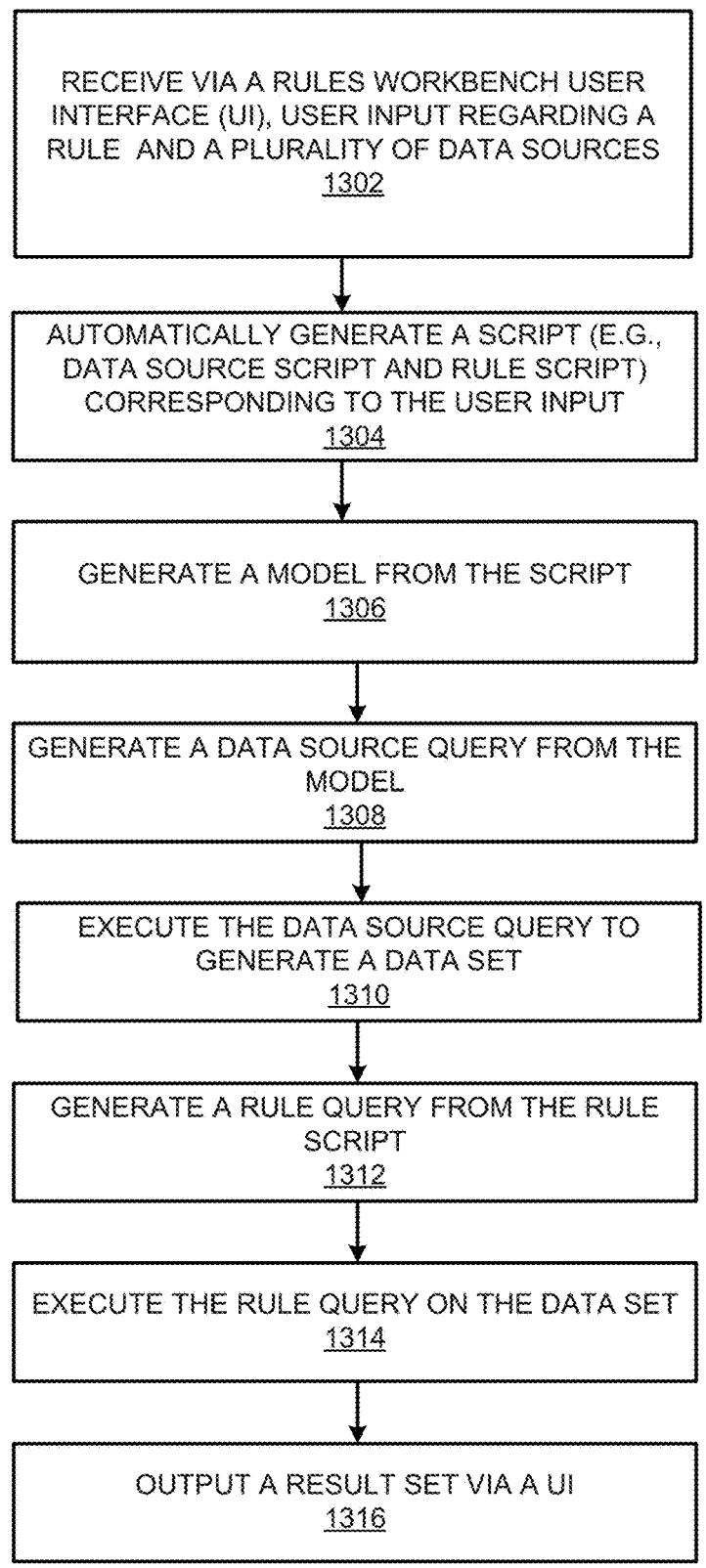

FIG. 13 shows a flowchart that details a method of scalable rule evaluation in accordance with the examples disclosed herein.

Figure 14:
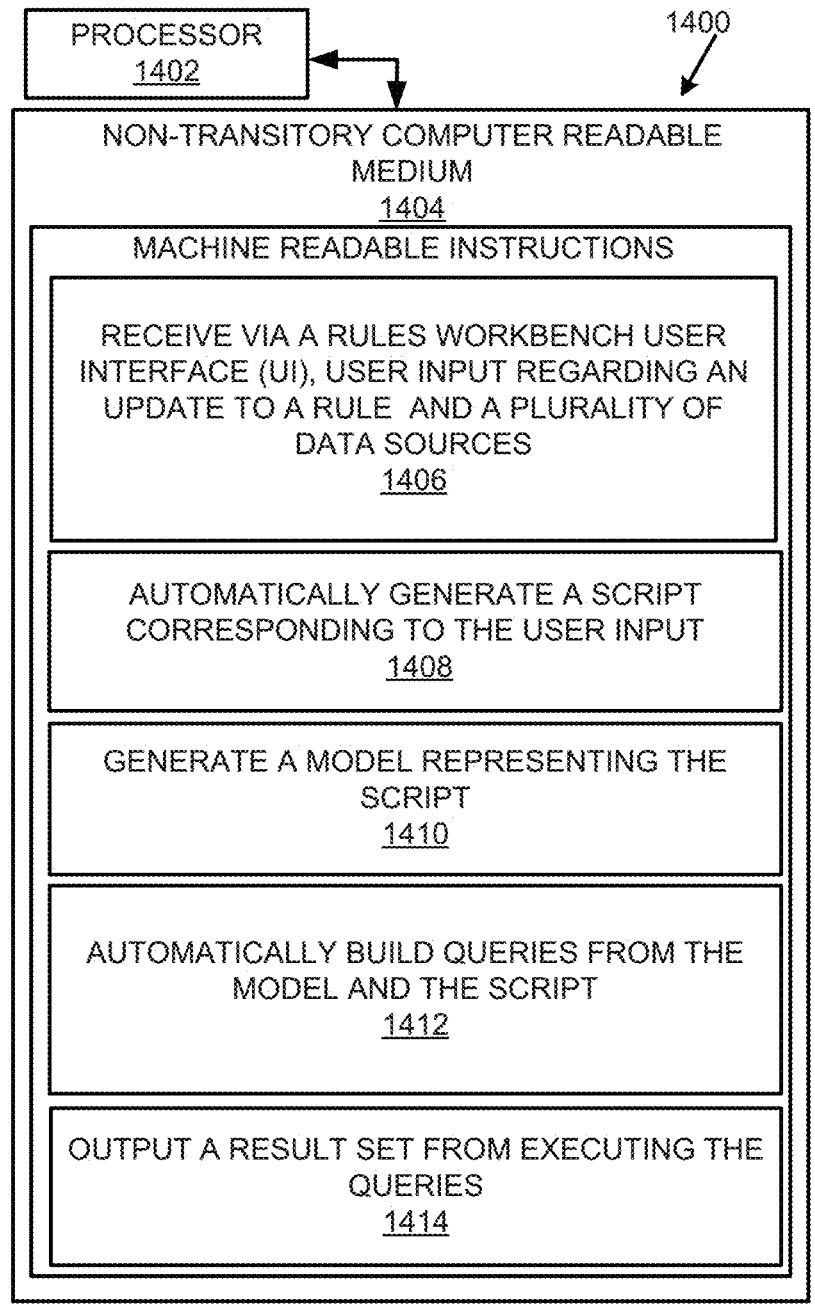

FIG. 14 shows a further example block diagram for scalable rule evaluation, according to examples.

FIG. 15 shows a program User Interface (UI) that displays a list of existing programs in accordance with the examples disclosed herein.

Figure 16:
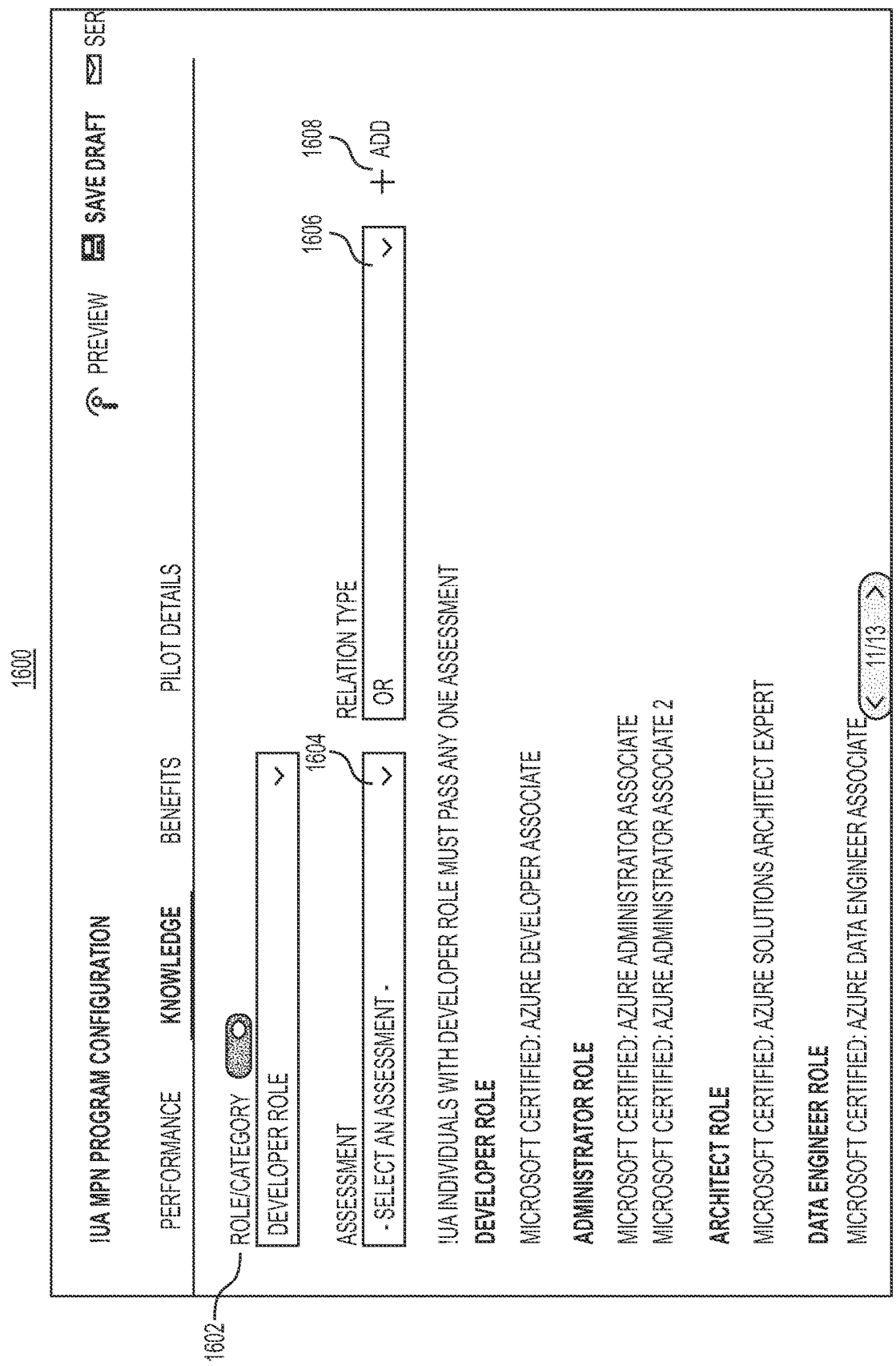

FIG. 16 shows a program configuration UI provided in accordance with the examples disclosed herein.

FIG. 17 shows a results UI provided in accordance with the examples disclosed herein.

Figure 18:
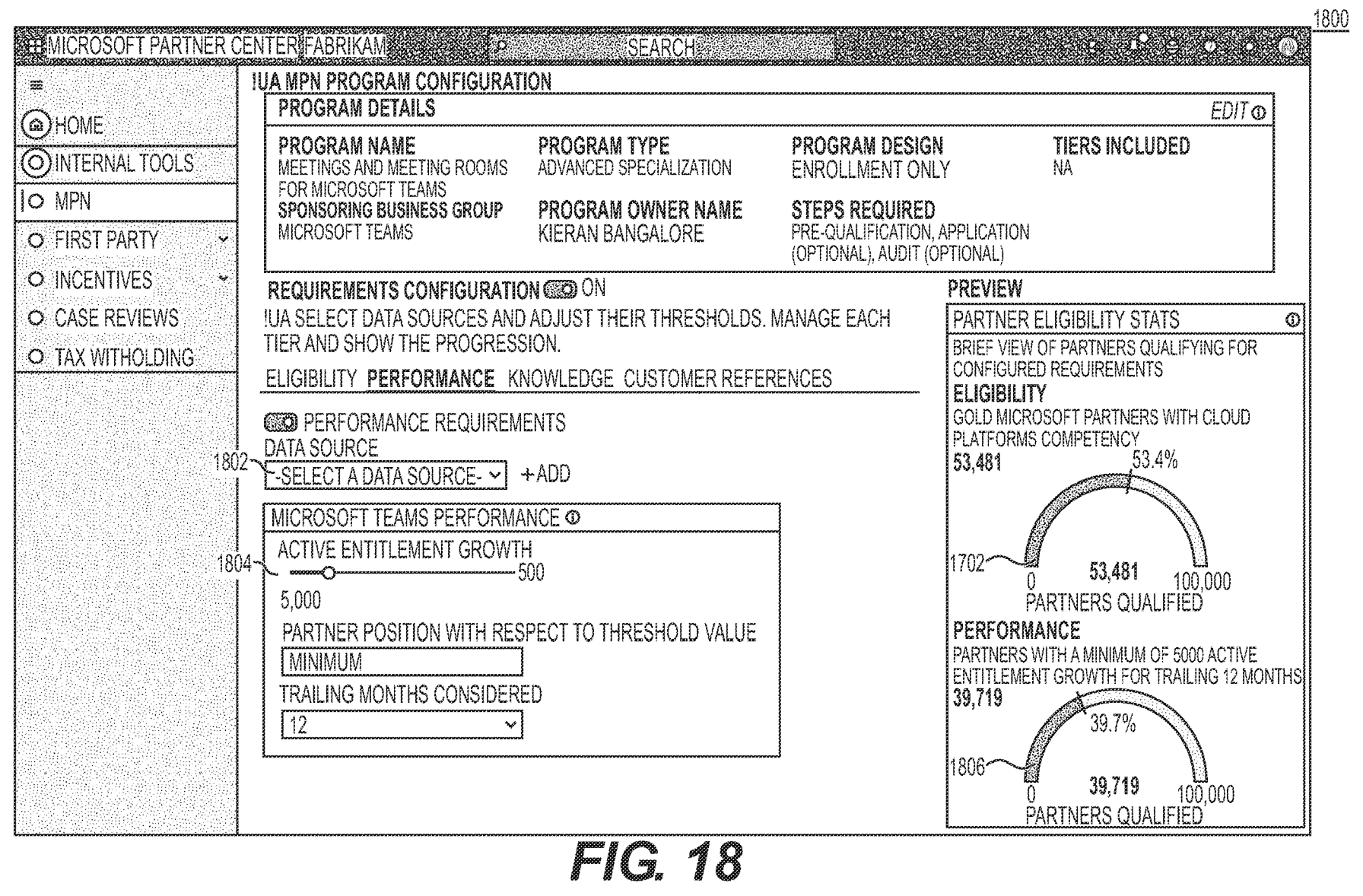

FIG. 18 shows a rules evaluation UI provided in accordance with an embodiment of the present disclosure.

DETAILED DESCRIPTION

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Examples are discussed herein for an automatic rule generation and evaluation system that can automatically generate code for rules that may be specified from received user input, such as user input entered in a UI. Scripts are generated based on the user input, and one or more of the scripts are used to generate a graphical model, such as a DAG, which specifies relationships between multiple data sources. Queries are automatically generated from the graphical model, which when executed against any compatible datastore, produces result sets for the rules. By way of example, the scripts that are generated based on user input may be JSON scripts, and the queries that are generated may be Structured Query Language (SQL) queries for a SQL compatible data store. Furthermore, many of the examples of the present disclosure described below refer to JSON scripts and SQL queries. However, other types of scripts and queries may also be generated. For example, Extensible Markup Language (XML), YAML (a recursive acronym for "YAML Ain't Markup Language"), or another type of script may be generated that can be parsed and used as input to create the graphical models. A script is computer readable and can be parsed by a computer to execute an instruction specified by the script. The script may also be human readable, such as including text that can be read and understood by a human. Similarly, for the queries that are generated by the automatic rule generation and evaluation system, query types other than SQL may be generated that are supported by the data store. For example, for a Azure™ datalike, the system may output a query in the Kusto™ query language. The system can generate queries in a query language applicable to the chosen data store.

In an example use-case, a company with multiple business groups allows the business groups to identify and evaluate potential, external partner companies that can provide particular services for particular business groups. Each business group can sponsor an individual, partner, membership program to seek partners that can provide the desired services for the business group based on a particular expertise. Potential partner companies for a business group can apply to become part of the partner membership program for the business group, and then the potential partner companies are evaluated as to whether they can be admitted to the partner membership program for the business group based on requirements created by the business group. To implement the partner membership program for the business group, the company creates customized software, referred to as partner evaluation software, to automate the evaluation of the potential partner companies based on the requirements. The creation of a new partner membership program or modification to an existing partner membership program requires an in-depth analysis of the new requirements (criteria that the partners need to fulfill to attain a competency and membership) and the benefits (the cost of the items provided as part of the program). Also, the engineering team has to determine how to implement the new requirements, which may include analyzing various data sources and dashboards to determine the changes that need to be made in the code. For example, from a code standpoint, every time a new requirement for a partner membership program is to be implemented in the partner evaluation software, the required code changes may necessitate about 3-4 weeks of engineering/coding work. Furthermore, finalizing the new requirement may require 2-3 man-months of work, because the new requirement needs to be tested, and if the results are unsatisfactory, then the new requirement needs to be further modified until the results are found to be satisfactory. Compared to the conventional, mostly manual approach, the automatic rule evaluation and generation system according to an example of the present disclosure enables automatic code generation, including generating and executing queries. For example, referencing the use case introduced above with regard to the partner membership program, the automatic rule evaluation and generation system receives a new requirement, including rules for the new requirement, via a UI from a user of the business group, and also receives a selection of data sources for applying the rule. The system generates a script from the user input, and generates queries on the fly based on the rules and the script, and executes the queries to generate a result set of data from data sources that are relevant to the rules. The result set, for example, includes potential partners that are determined to qualify for the partner membership program based on the new requirement. Accordingly, the system provides for a low coding/no coding solution for code generation that can be utilized by a non-programmer, such as a user of the business group that needs to implement new requirements in the partner evaluation software for the partner membership program. Additionally, the automated code changes allow the business user to test new requirements on-the-fly to determine whether a new requirement impacts the number of potential partners affected by the new requirement. Thus, the automatic rule generation and evaluation system allow non-programmer users to perform what-if analysis according to new requirements. Thus, the automatic rule generation and evaluation system allows the business user to: design a program and analyze the impact on entities affected by the program such as the number of partners who would qualify for a particular competency or advanced specialization and the associated cost; establish workflow towards approval from relevant approvers across the business group; and take the program to production with little or no engineering involvement. Accordingly, the automatic rule generation and evaluation system is significantly faster in execution and improves efficiency in the process to create or update rules coded in software with minimal or no involvement from the engineering team.

Figure 1:
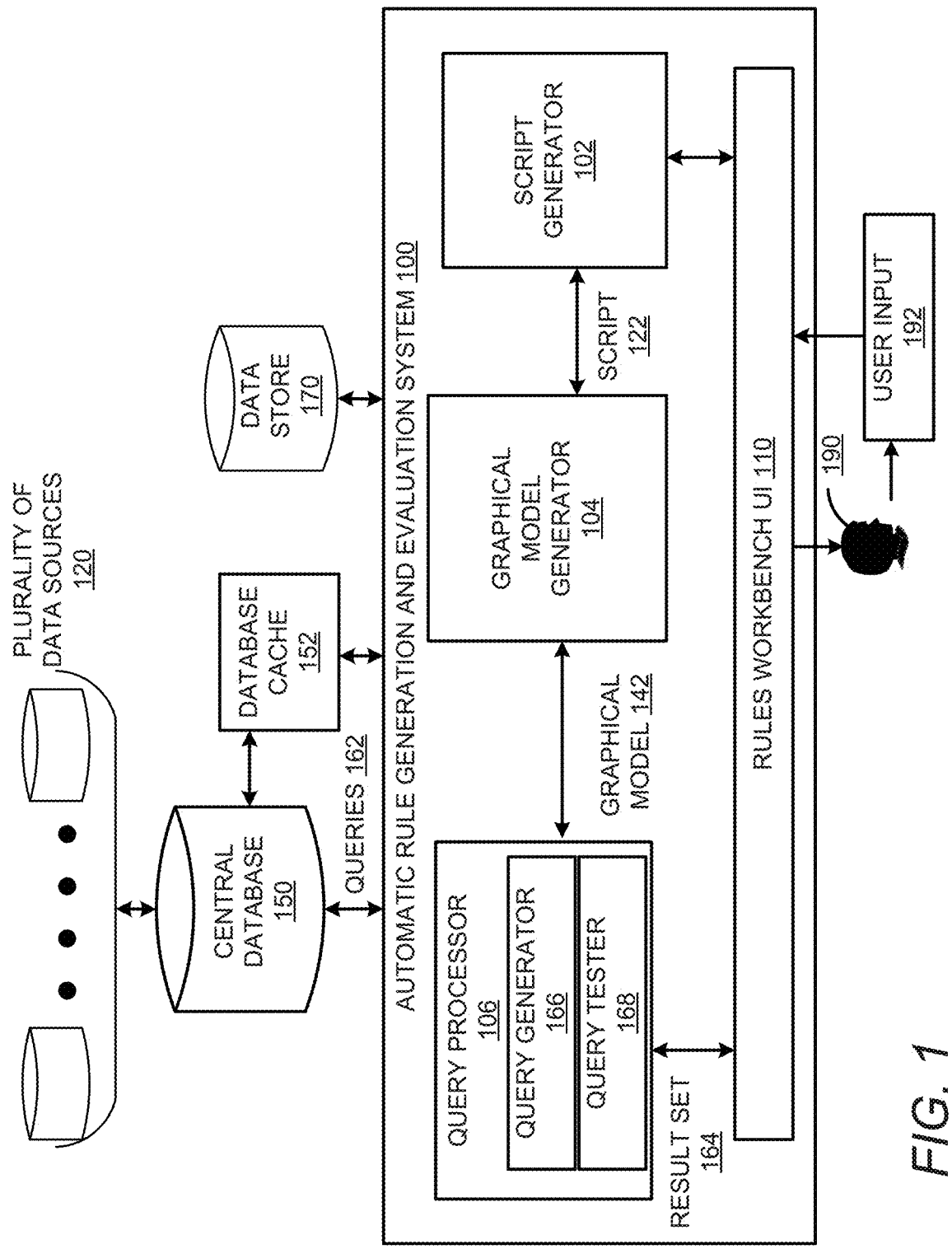
FIG. 1 shows a block diagram of an automatic rule generation and evaluation system implemented in accordance with the examples disclosed herein.

FIG. 1 shows a block diagram of an automatic rule generation and evaluation system 100 implemented in accordance with the examples disclosed herein. The automatic rule generation and evaluation system 100 is discussed below with reference to the example use-case regarding the partner evaluation software for the partner membership program for illustration purposes only, and can be used for automatic rule generation and implementation in other use cases. The overall architecture of the automatic rule generation and evaluation system 100 includes data preparation, rule generation, and user interaction. The data preparation and processing include preparing raw data (e.g., cleaning, filling in missing values, processing outliers, deduplication, etc.) and injecting the processed data into a central database 150. A user 190 can effect changes by creating new rules or editing existing rules via the automatic rule generation and evaluation system 100. The automatic rule generation and evaluation system 100 includes a rules workbench UI 110, a script generator 102, a graphical model generator 104, and a query processor 106. The automatic rule generation and evaluation system 100 can also be coupled to a local data store 170 for storing and accessing data used in the rule generation and evaluation processes.

In the example use case related to configuring the partner membership program for evaluating partner competencies and implementing partner programs, the user 190, such as a program manager, can create and enter user input 192 with the requirements via the rules workbench UI 110. The relevant partner data is gathered from the various external partner data sources, e.g., one or more of the plurality of data sources 120, based on the user requirements, and stored in the central database 150. In an example, the plurality of data sources 120 and the central database 150 can be configured to store structured data. For example, the plurality of data sources 120 and the central database 150 can include relational database management systems (RDBMS) wherein the data can be retrieved and manipulated using a query language specific to the RDBMS, such as SQL. A portion of the data which may be needed for daily evaluation can be stored in a distributed database cache 152. The rules workbench UI 110 can display data (e.g., qualifying partners) from one or more of the plurality of data sources 120, the central database 150, and the distributed data cache 152 based on the user requirements. The rules workbench UI 110 enables rule generation so that users responsible for building new programs can iteratively build the rules for designing a new competency or advanced specialization program, measure the impact of the rules and the thresholds chosen on a real-time basis, and publish the rules once completed. For example, the user 190 may enter partner membership program attributes via input/output (I/O) screens of the rules workbench UI 110. Examples of the partner membership program attributes entered by the user 190 may include one or more of program name, program description, requirements for partners to qualify for the partner membership program, and relevant data sources (e.g., the plurality of data sources 120) for applying rules determined from the requirements. The user 190 can also add new entities and new requirements for a given competency through the rules workbench UI 110. Adding requirements enables the user to alter rules and one or more underlying data sources of the plurality of data sources 120.

When the user accesses one or more I/O screens of the rules workbench UI 110 to enter requirements and identify data sources as part of the user input 192, the script generator 102 generates a script 122 corresponding to user input 192. The user input 192 may be entered according to user experience (UX) flows of the rules workbench UI 110. In an example, the script 122 can be generated based on templates that are populated with data from the user input 192. For example, as the user 190 enters rule-based information and data source information via different I/O screens of the rules workbench UI 110, then script 122 is produced based on populating the entered information into code templates. The populated code templates form the script 122.

The script 122 may include a rule script comprised of rules determined from the user-entered requirements and a data source script comprised of information for data sources of the plurality of data sources 120 that are selected in the user input 192. The rule script and the data source script can be provided as a single script or as separate scripts.

The data source script can have an id, an array of data sources selected from the plurality of data sources 120, the central database 150, or the database cache 152, the particular data fields selected for data retrieval or data manipulation, an array of relations, also referred to as relationships, between the selected data sources, and join and/or union criteria for aggregating the selected data sources. A relation exists between two tables when one of them has a foreign key that references the primary key of the other table.

Below are shown some non-limiting examples of data elements that can be accessed and selected by the user from the rules workbench UI 110 and included in the data source script of the script 122. Also, the properties of the data elements and whether the data element is required for script generation is included in the tables below:

DataSource

| Element | Required | Description |
| --- | --- | --- |
| dataSourceId | Y | Id for current data source |
| sourceType.type | Y | Type of data source. Possible values are [table, SQL, sp] |
| sourceType.tableName | N | Name of the SQL table for the generated query to run |
| sourceType.alias | N | Alias given to generated data source SQL |
| persist | Y | If true then the generated query would be executed and the resultset would be stored in a table (destination) specified as part of JSON. Could be used to checkpoint or simplify the query generation process. |
| destination | N | Required attribute if persist is set to true. |
| projections | N | List of columns projected from the underlying data source |
| measureFilter | N | Filters applied on the measure |
| rowFilter | N | List of predicates to be applied |
| rowOrder | N | Sorting information for the rows |

Also shown below are relations (e.g., relationships), joins, and unions between the data elements, their descriptions, and whether the element is required in script generation:

Relations

| Element | Required | Description |
| --- | --- | --- |
| from | Y | Starting vertex for the directed edge |
| to | Y | Ending vertex for the directed edge |

Joins

| Element | Required | Description |
| --- | --- | --- |
| type | Y | Type of joins to be applied to join "first" data source with "second" |
| first | Y | Name of the first data source |
| second | Y | Name of the second data source |
| condition | Y | Join condition to be applied |

Unions

| Element | Required | Description |
| --- | --- | --- |
| type | Y | Type of unions to be applied. Possible values |
| parent | Y | Parent data source which receives the union result |
| children | Y | An array of data source id(s) that has to be unioned |

The data source script of the script 122 produced by the script generator 102 is accessed by the graphical model generator 104 to generate a graphical model 142 of the script 122. In an example, the graphical model can include structures with nodes/vertices and edges/arcs, such as a DAG. Each edge of the DAG is directed from one vertex to another, such that the edges do not form a closed loop. A directed graph is a DAG if and only if it can be topologically ordered, by arranging the vertices as a linear ordering that is consistent with all edge directions. Each node in the graphical model 142 can correspond to a data source such as a database table, a view or other data structure derived from another data source, etc. Edges between the vertices can represent one or more of relationships, unions and joins between the data sources.

The graphical model 142 is provided to the query processor 106 which includes a query generator 166 and a query tester 168. The query generator 166 automatically generates one or more queries 162 corresponding to the graphical model 142 and the script 122. In an example, the one or more queries 162 can include a rule query and a data source query. The rule query and the data source query can be comprised of a single query or multiple queries. The rule query includes rules identified from parsing the rule script of the script 122 to identify requirements, such as conditions, that are populated into the rule query. The data source query is generated from the graphical model 142 as is further discussed below. The query tester 168 is configured for executing the queries 162. In an example, the data source query is executed to generate a dataset by aggregating the data sources identified from the data source script, and the rule query is executed on the dataset to produce a result set 164 which displays results obtained from retrieving the data and applying the rules to the retrieved data. The result set can be displayed via one or more of the I/O screens of the rules workbench UI 110. If the user is satisfied with the results, the user may finalize and publish the rules from the rule query, so the rules are used going forward to determine qualified partners. If the user is not satisfied with the rules, the user can provide further rule changes to produce different results. For example, if particular rules applied to the partnership membership program do not produce adequate partners who meet the criteria, then the user 190 may change the rules to loosen the criteria so that more partners meet the criteria and may be inducted into the partner membership program. Therefore, the user can test the rules on the actual data sources before finalizing and publishing the rules to the partner membership program.

Some example requirements for which rules can be generated by the user 190 by employing the automatic rule generation and evaluation system 100 include a competency requirement such as a requirement that a partner should be 'Gold' in Cloud Platform competency, a certification requirement which may require that at least five individuals associated with a given partner should have certifications for a security engineer, a solution architect, etc. A performance requirement that the partner must have may include at least $X per month of customer revenue from Windows Virtual Desktop (WVD) Native workloads aggregated from at least one or more customers. The requirements may further include a notification requirement so that partners who have not been notified during the last 30 days are evaluated. By way of example, there can be six different data source categories within the central database 150, which can include: a competency category, a certification category, an assessment category, a revenue category, a partner notification category, and a partner overrides category. The aforementioned data can be imported into the central database 150 periodically. These sets of data can have the added advantage of providing the same aggregates at various points along the competency evaluation process where they are referenced. Rules pertaining to the above conditions are generated and when published, become part of the partner evaluation software for partner evaluation, and the results of the evaluation can be provided to the partners through a partner user interface on a computing device. The rules workbench UI 110 communicates with the central database 150 to generate the queries 162 that along with other metadata about the program like name, area, activation data, etc., goes into the cache 152.

The automatic rule generation and evaluation system 100 allows the user 190 to save the current rules as a draft or publish the rule to production. Runtime evaluation of the rules can happen from data stored in the cache 152 providing a boost in performance. The configuration, generation, and execution of the queries 162 can occur either in the central database 150 or on the cache 152. The user 190 can execute multiple iterations of the rules and as the user 190 changes a requirement, the rules workbench UI 110 can show the user 190 the effect of the change in real-time, e.g., within minutes. The impact of the change could be the total number of partners that qualified given the ruleset and more details around which rules contributed to the total number of failures. This real-time feedback mechanism greatly helps the user 190 to tweak the rules and the associated threshold values and be more confident about the impact before publishing the rules to be deployed to production. When the user 190 can load up all the requirements for all the requirement types, the user 190 gets one consolidated result including an impact of the requirements i.e., the result set 164. This allows the user 190 to make as many rule changes as needed until a result set pertaining to the rules that satisfies the user 190 is generated thereby allowing the user to make data-driven decisions on what the requirements should be. For example, the rule(s) pertaining to Gold/Silver partner qualification can be changed to adjust the number of partners that will qualify for the Gold/Silver program when the ruleset goes into production.

The queries 162 thus generated and stored are employed by an automated rule-implementation process (e.g., a scheduled chron job) to execute an evaluation process on a predefined schedule for all the partner membership programs. The detailed results generated from applying the rules to the data from the plurality of data sources 120 can be stored in the central database 150 so that an I/O screen of the rules workbench UI 110 can present the result sets to users. The automatic rule generation and evaluation system 100 can be coupled to or include an approval processing system for obtaining approval for the new rules and/or the new program before implementation. Upon completing the approval processing, the ruleset can be stored and run periodically (e.g., nightly) against the partner data to pre-enable partners as their data is accessed by a partner program management system which may include the automatic rule generation and evaluation system 100 as a component. When a customer (partner) accesses an I/O screen of the rules workbench UI 110, the partner can get the latest information with regards to the new competency or the updated requirements for an existing competency.

Figure 2:
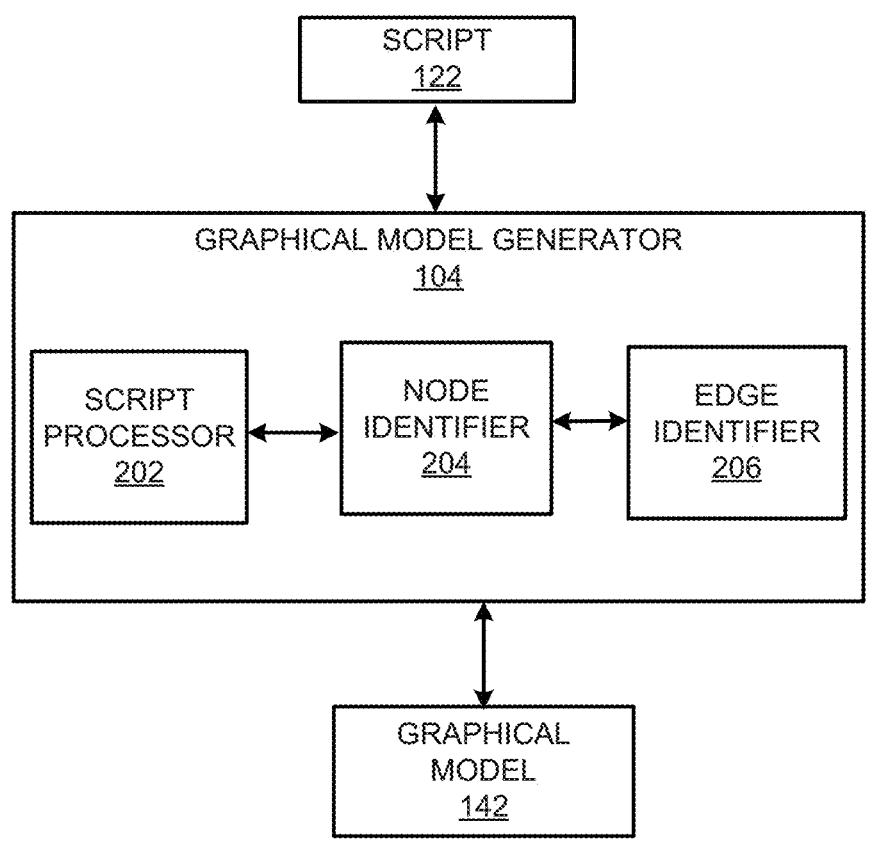
FIG. 2 shows a block diagram of a graphical model generator in accordance with examples detailed herein.

FIG. 2 shows a block diagram of the graphical model generator 104 in accordance with examples detailed herein. The graphical model generator 104 includes a script processor 202, a node identifier 204, and an edge identifier 206. The script processor 202 accesses the script 122 and processes the script 122 via parsing, tokenizing, and keyword and symbol identification. The script 122 (e.g., data source script) is processed to identify data sources and to determine how to combine relevant data from the data sources, such as through unions and joins of tables, to generate a dataset for applying the rules also specified in the script 122 (e.g., the rule script). Specific keywords such as "data source" or "data source id" generated by the script processor 202 are employed by the node identifier 204 to identify the particular tables and/or columns or other data sources as nodes/vertices for the graphical model 142 to be generated. Similarly, keywords such as "from", "to", "relations", "joins", "unions", etc., can be employed by the edge identifier 206 to identify the incoming or outgoing edges from each of the vertices. The node identifier 204 and the edge identifier 206 can therefore include classifiers trained to identify specific terminology.

Figure 3:
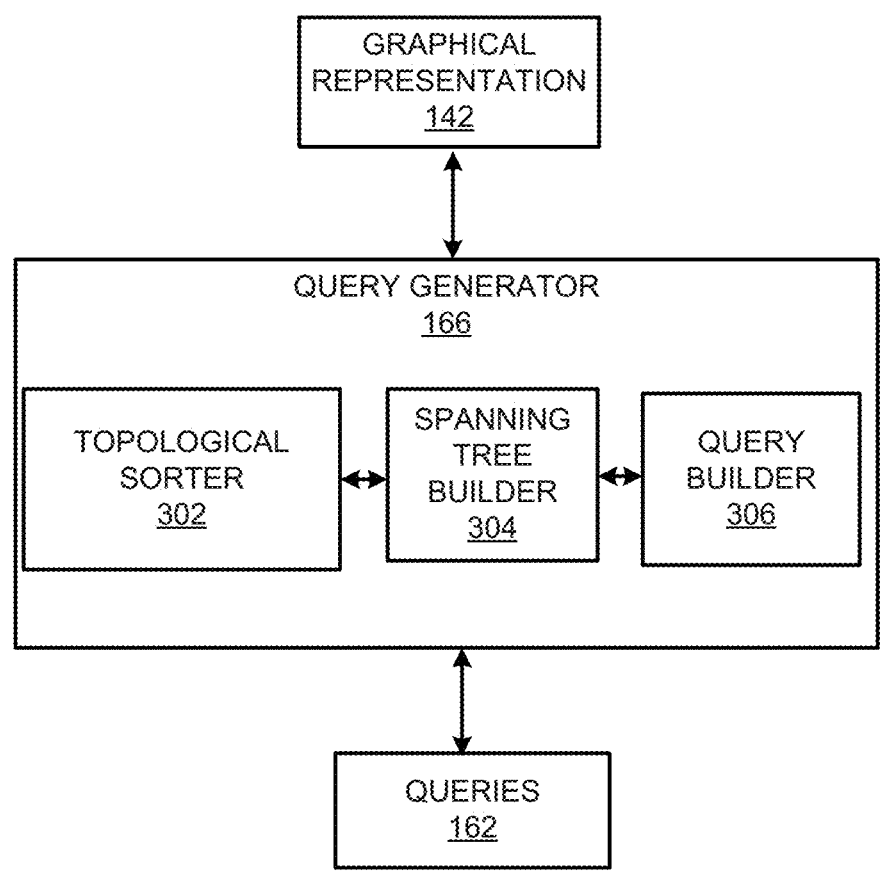
FIG. 3 shows a block diagram of a query generator in accordance with the examples detailed herein.

FIG. 3 shows a block diagram of the query generator 166 in accordance with the examples detailed herein. The query generator 166 includes a topological sorter 302, a spanning tree builder 304, and a query builder 306. The spanning-tree builder 304 grows a spanning tree, by visiting each node or vertex in the graphical model 142, e.g., the DAG, while honoring the adjacency relationships between the vertices. The graphical model 142 for example is built from the data source script of the script 122 and may be a DAG. In order to identify the first vertex to process, a linear ordering of the vertices is generated such that for every directed edge u-v from vertex u to vertex v, u comes before v in the ordering assuming that the DAG is represented as G(V, E) where V is the collection of vertices in the graph and E is collection of all the directed edges. Accordingly, the topological sorter 302 implements techniques such as Kahn's algorithm for the topological sort. The spanning-tree builder 304 generates the spanning tree from the topologically sorted vertices. The spanning-tree generation process returns an edge whose tree endpoint was discovered earliest (or least recently). The vertex discovery fans out from the start vertex yielding the shortest path length from the start vertex to every other vertex in the graphical model 142 using methodologies such as Breadth First Search (BFS) method. The query builder 306 processes the graphical model 142 sequentially from the bottom and generates the query statements for each vertex at each leaf layer to output one or more of the queries 162, such as the data source query.

Figure 4:
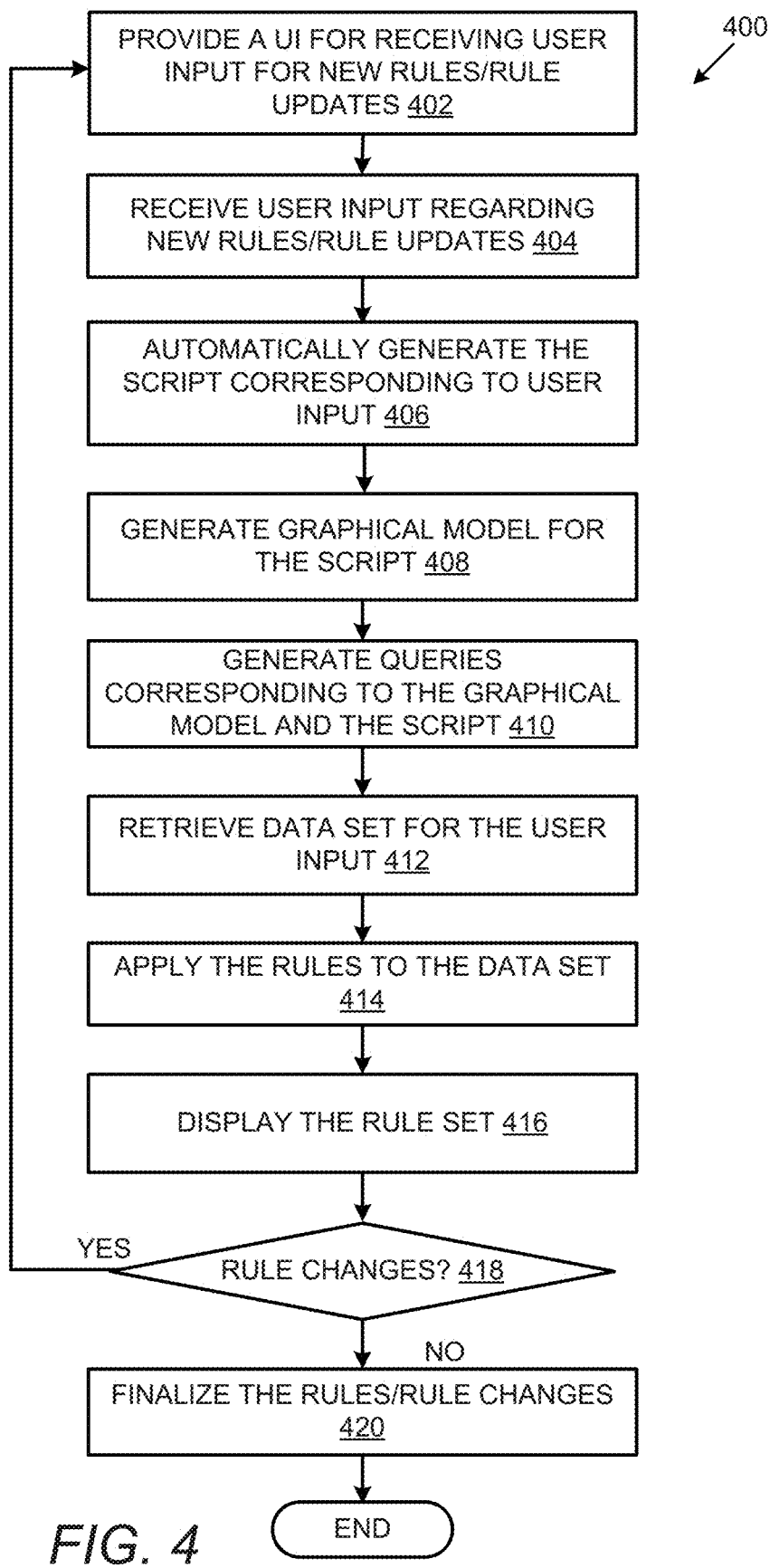
FIG. 4 shows a flowchart that details a method of rule generation and evaluation in accordance with the examples disclosed herein.

FIG. 4 shows a flowchart 400 that details a method of rule generation and evaluation in accordance with the examples disclosed herein. The method begins at 402 wherein a UI, e.g., a UI in the rules workbench UI 110, is displayed to the user 190 for receiving the user input 192 regarding new rules, which may include modifications to existing rules, and selection of data sources for applying the rules. The rules workbench UI 110 can be connected to the plurality of data sources 120, thereby giving the user the ability to select the data sources (e.g., the databases, the tables, and/or the columns) for processing the rules. The rules workbench UI 110 also includes mechanisms that enable the user 190 to define new entities such as new partner membership programs and attributes for the new entities. At 404, the user input 192 regarding rules for adding a new entity or updating an existing entity is received via the rules workbench UI 110. The user input 192 can be received by the user selections of one or more of the plurality of data sources 120 to be used for implementing the changes (e.g., adding new entities, or updating existing entities) and the rules about specific data elements such as attributes of the entities. At 406, the script 122 corresponding to the user input 192 is generated. In an example, the rules workbench UI 110 can be configured to automatically generate the script 122 (e.g., the rule script and data source script) corresponding to the user input 192. The script 122 enables generating queries on the fly to implement the user changes. The queries can include definitions for new data elements for one or more of the plurality of data sources 120 (e.g., Data Definition Language (DDL) queries). The queries may also enable manipulating existing data elements (i.e., Data Manipulation Language (DML)) such as making updates to rows and/or columns, linking data elements via joins, unions, relationships, etc. The graphical model 142 representing the script 122 is generated at 408. The graphical model 142 can include nodes representative of one or more of the plurality of data sources 120 included in the script 122 based on the user input 192 and edges, representing relationships, joins, unions, etc., between the user-selected data sources. The relationships are identified from the script 122 while the joins or unions may be identified from the metadata associated with the data sources accessed by the script 122. The queries 162 are automatically built from the graphical model 142 and the script 122 at 410. In an example, the data source query is generated from the graphical model 142 such as described with respect to FIGS. 3 and 5-6, and the rule query is generated from rules specified in the rule script of the script 122. The DDL queries may be part of the data source query and can represent attributes related to a new program. The DML queries can be part of the rule query and may include updates to rules to be implemented for an existing program such as changing thresholds, etc.

At 412, a data set is retrieved by executing the data source query, and at 414 the rule query is executed on the data set to retrieve the result set 164. The result set 164 thus retrieved may be stored in the cache 152 and may be displayed at 416 in real-time. It may be noted that the on-the-fly generation of the script 122 and the graphical model 142 enables the automatic rule generation and evaluation system 100 to display the result set 164 in real-time.

Upon displaying the result set 164 at 416, it is further determined at 418, if the user 190 desires to implement additional rule changes based on further user input. If further rule changes are required, the method returns to 402 to provide the rules workbench UI 110 to receive user input for the further changes. If no further changes are required, the new rules/updates to existing rules are finalized and the finalized rules are uploaded to the central database 150 at 420. The on-the-fly generation of the script 122, the graphical model 142, and the queries 162 speeds up the process of implementing new rules/rule updates by providing the results of the rule changes in real-time so that if the user is not satisfied with a new rule or rule update, then the user can change the rules until a satisfactory result is obtained. For example, if further user input is received for additional rule changes, then the steps detailed above are repeated to automatically generate a further script corresponding to the further user input, generate further graphical models representing the further script, and automatically build one or more further queries from the further graphical models so that the further queries include the rules generated per the further user input. A further output generated in response to the further changes to the rules is displayed. These steps are iteratively executed until it is determined based on the further user input, that no further changes to the rules are required. Therefore, the automatic rule generation and evaluation system 100 enables users to test the results of implementing new rules and/or rule changes prior to finalizing and uploading the rules/rule updates to the central database 150.

Figure 5:
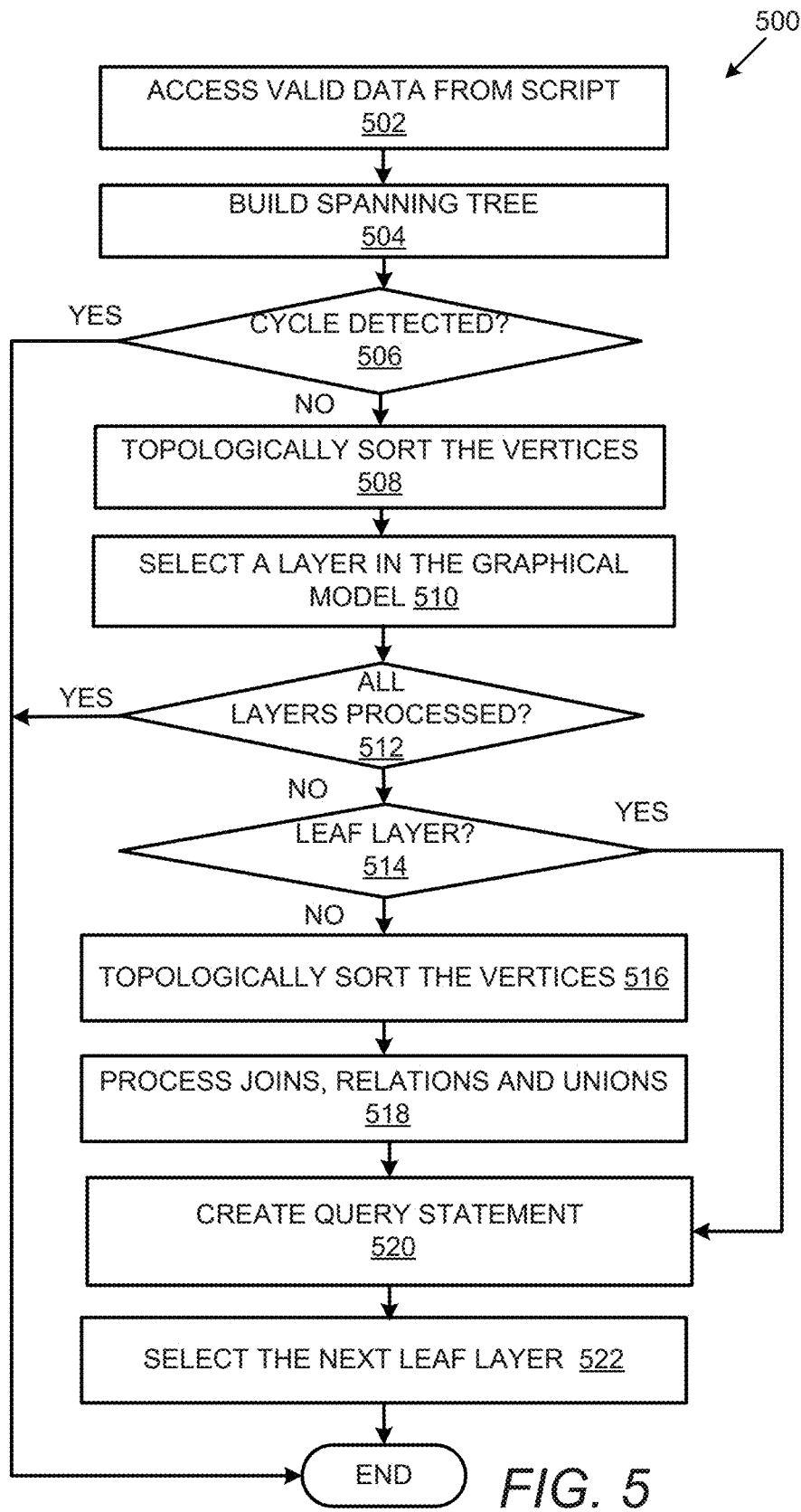
FIG. 5 shows a flowchart that details a method of generating a query from a graphical model in accordance with some examples.

FIG. 5 shows a flowchart that details a method of generating the query 162, such as the data query, from the graphical model 142 in accordance with some examples. The method begins at 502 wherein data from the script 122 for the creation of graphical model 142 is accessed. At 504, the spanning tree is built from the graphical model 142 as detailed herein. Given a graph G=(V, E), a subgraph of G that has (v−1) edges that connect all of the vertices and is a tree is called a spanning tree. More particularly, at 506, it is determined if the spanning tree is a minimum spanning tree which is an undirected graph that connects all the vertices without any cycles. If any cycles are detected at 506, the process is aborted and the method terminates on the end block. If no cycles are detected at 506, then the vertices are topologically sorted at 508 using, for example, Kahn's algorithm. This enables identifying the starting vertex in the graph for sequential processing. At 510, a layer of the graphical model 142 is selected. At 512, it is determined if all the layers are processed. If yes, the method 500 terminates on the end block. If it is determined at 512, that some layers remain for processing, the method moves to 514 where it is determined if the selected layer is a leaf layer. If it is a leaf layer, the method moves to 520 to create a query statement for each node in the leaf layer. If it is determined at 514 that the layer is not a leaf layer, then all the nodes in the layer are topologically sorted at 516, the relations, joins, and/or unions are processed at 518, and the method moves to 520 to create the query statement for each of the nodes in the layer. The method moves to 522 to select the next layer for query statement generation all the way to the root of the spanning tree.

Figure 6:
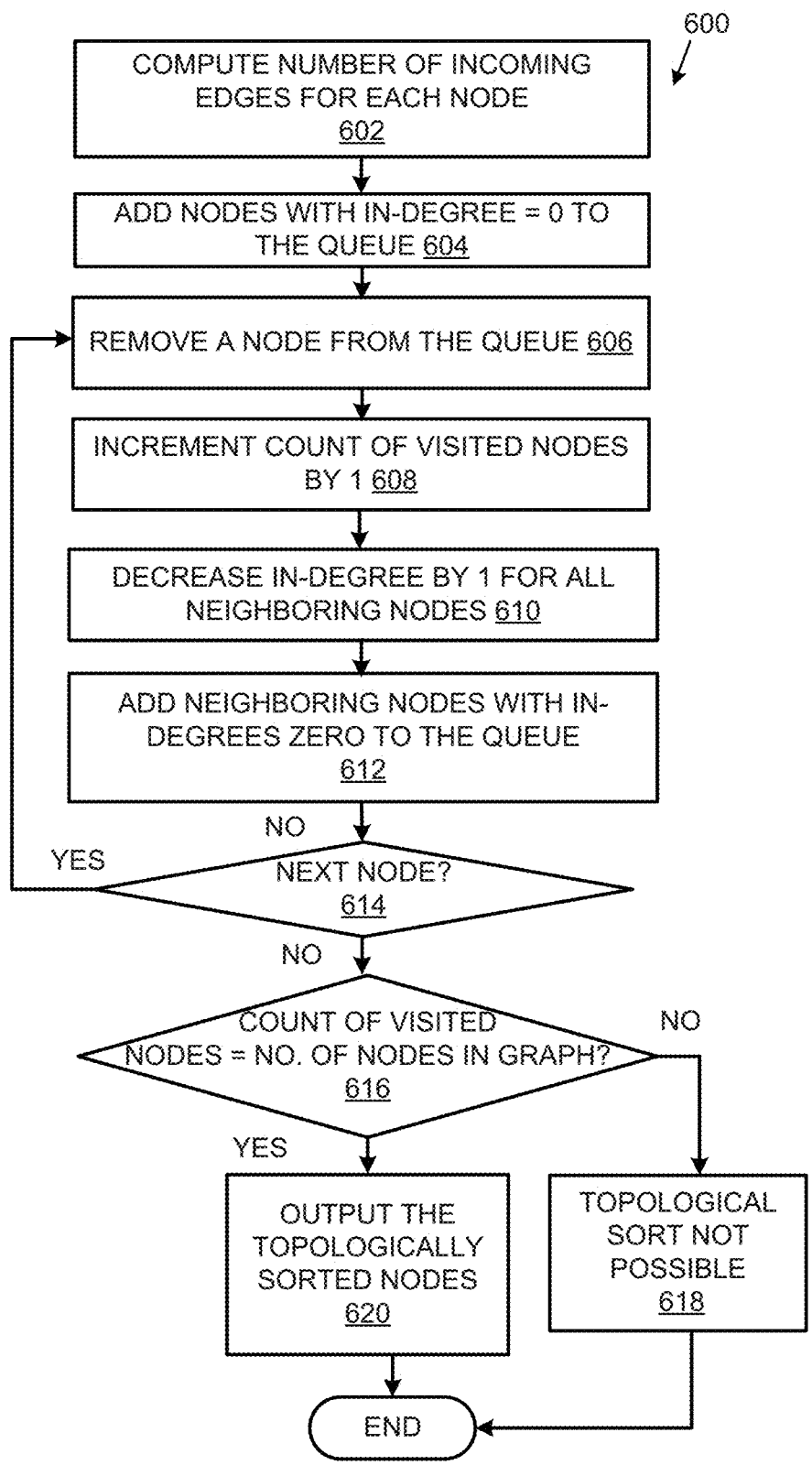
FIG. 6 shows a flowchart that details a method for topological sorting of vertices based on Kahn's procedure in accordance with some examples disclosed herein.

FIG. 6 shows a flowchart 600 that details a method for the topological sorting of nodes in the spanning tree based on Kahn's procedure in accordance with some examples disclosed herein. The steps of the method 600 may be performed for step 508 discussed above. The method 600 begins at 602 wherein the number of incoming edges (i.e., the in-degree) is computed for each node. The nodes with the number of incoming edges or the in-degree equal to zero are identified and added to a queue at 604. At 606, a node is removed from the queue. The count of the visited nodes is incremented by one at 608. Further, the in-degree is decreased by one at 610 for all the neighboring nodes of the node removed from the queue. At 612, the neighboring nodes with in-degree zero are also added to the queue. At 614, it is determined if the next node can be selected. If yes, the method returns to 606 to remove a node from the queue, and the subsequent steps 608-612 are repeated until no more nodes can be selected at 614. Upon processing all the nodes, it is further determined if the count of visited nodes equals the number of nodes in the graph. If yes, the topologically sorted nodes are output at 620 and the method terminates on the end block. If it is determined at 618 that the count of visited nodes is not equal to the number of nodes in the graph, it is determined at 618 that the nodes cannot be topologically sort ed and the method terminates on the end block.

Figure 7:
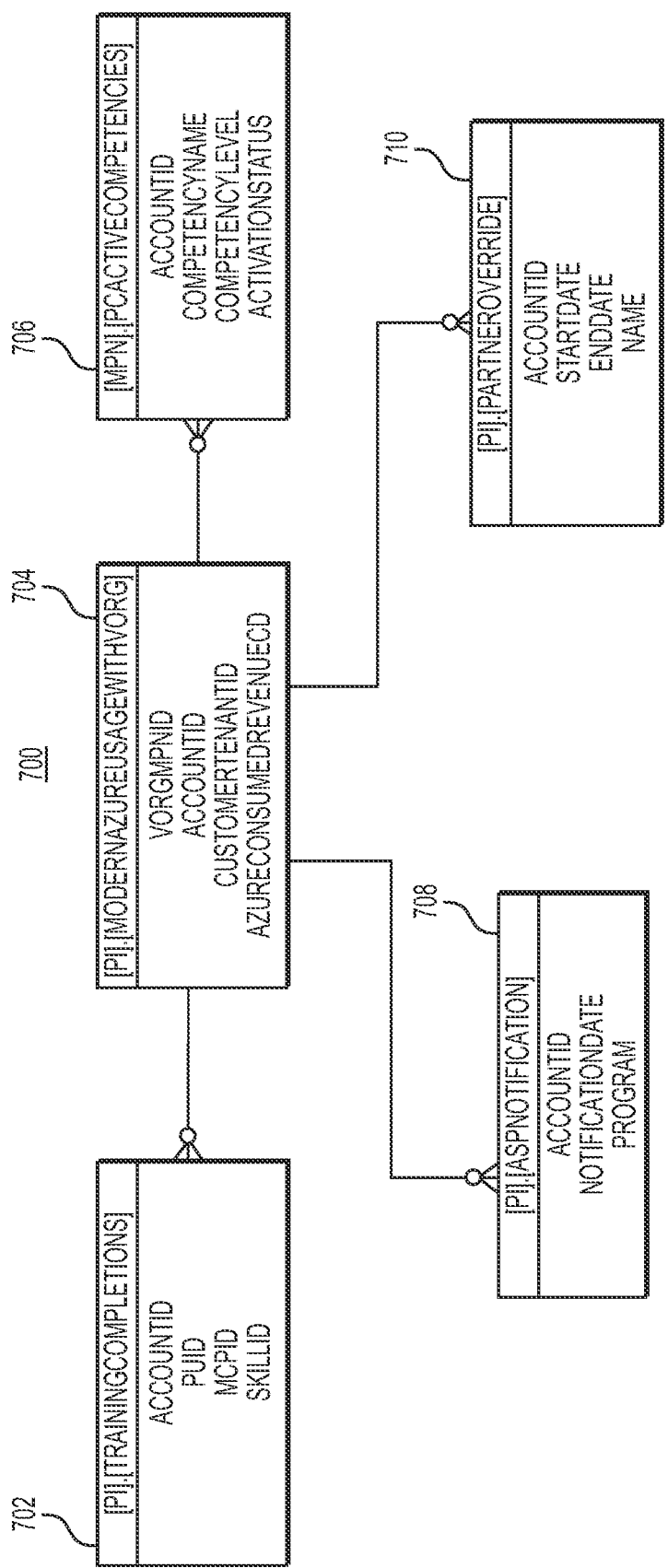
FIG. 7 shows some example database tables used for rule generation in a partner competency program in accordance with the examples disclosed herein.

FIG. 7 shows some example database tables 700 and their columns. One or more of the database tables 700 and columns of the database tables 700 may be selected as part of the user input 192 and used to generate the data source script, the graphical model 142 and the data source query. In an example, the database tables 700 include data for which rules from the user input 192 can be applied for a partner membership program. The database tables 700 includes a [pi].[TrainingCompletions] table 702, a [pi].[ModernAzureUsagWithvOrg] table 704, a [mpn].[PCAcitveCompetencies] table 706, an [pi].[ASPNotification] table 708 and a [pi].[PartnerOverride] table 710. Whenever the user 190 enters new requirements or modifies existing requirements/programs, the rules workbench UI 110 is configured to generate the corresponding scripts to manipulate one or more of the plurality of data sources 120 to respond to the user requirements, e.g., rules. The various data fields can be retrieved from the example tables 700 based on the requirements entered by the user in the rules workbench UI 110. New columns can be added or new rows may be appended to the tables in a database by generating the queries 162 on the fly from the script 122 generated in response to the user requirements and of course, subject to the approval of the appropriate responsible party.

Figure 8A:
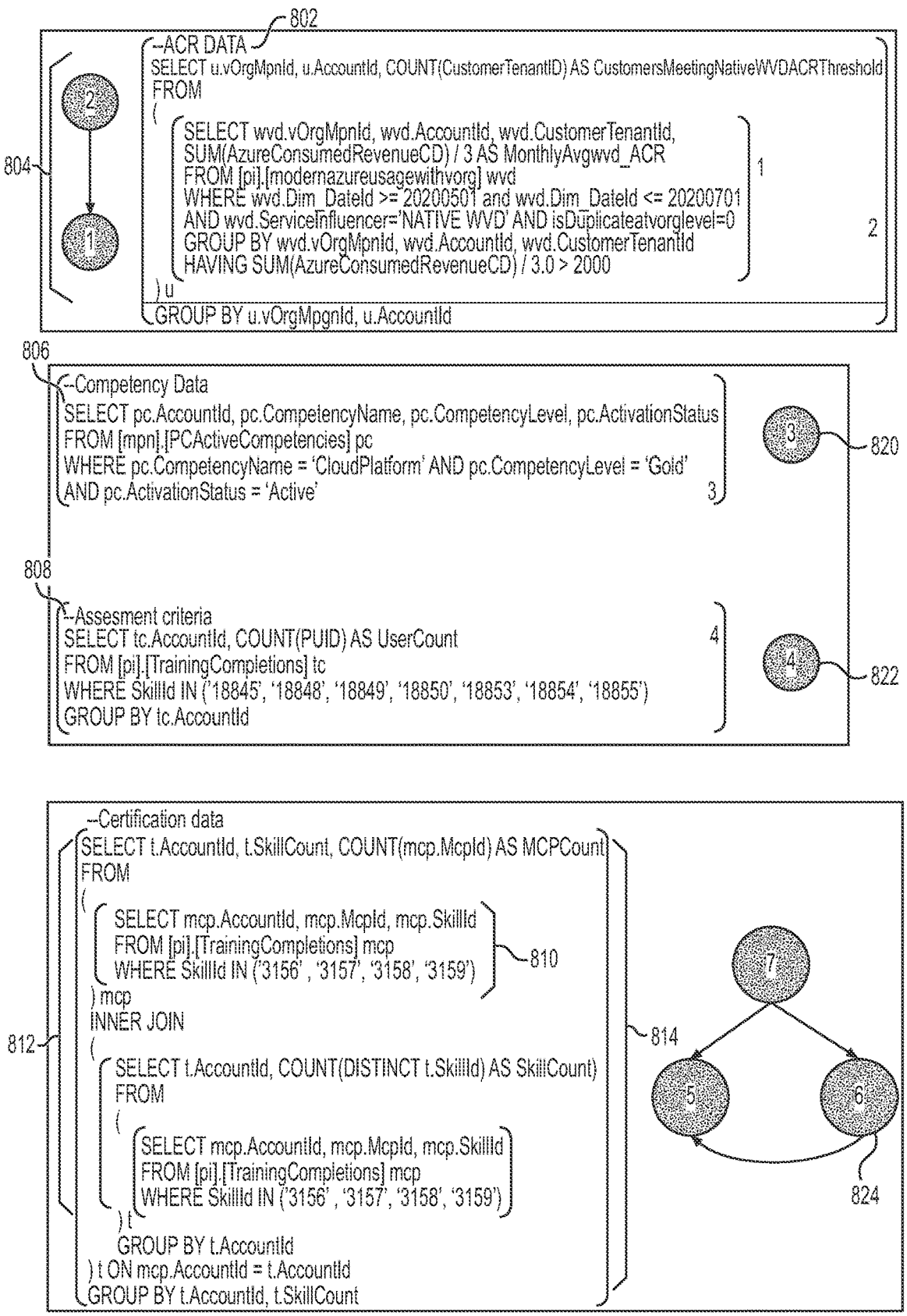
FIG. 8A shows some example queries and corresponding Directed Acyclic Graphs (DAGs) in accordance with the examples disclosed herein.

FIG. 8A shows example queries and the corresponding graphical models generated from the user input in accordance with the examples disclosed herein. Particularly, the graphical models 804 and 824 illustrated are DAGs. Based on the user input received from the rules workbench UI 110, performance data for partners can be fetched from the [pi].[ModernAzureUsageWithvOrg] table 704 with an automatically-generated nested query 802. If individual query segments are treated as nodes in graph 804, then, the outer node 2 derives all its data and aggregations out of the projection list of node 1. Further, both competency and assessment data nodes are fairly straightforward with independent nodes 3 and 4 corresponding to the queries 806 and 808. Certification data collection is more complex where node 5 representing query segment 810 is used by both node 7 and node 6 so that the outer query segments 812 and 814 derive their data and aggregations out of the query segment 810. As is evident from the discussion above, one or more of the data sources (i.e., data retrieval statements for the tables 702, 704, etc.) used for processing the rules are represented as vertices or nodes of a directed acyclic graph (DAG) shown at 820, 822, and 824. Edges between the vertices represent the relationships between the data sources. The relationships across the levels are fully contained, however, implicit relationships within a level are derived out of their join or union metadata. The goal of the rule evaluation process or the program management process is to traverse each node, respect the order of creation and build the final query to be executed against/the central database 150.

One or more of the example query statements shown in FIG. 8A that are generated from corresponding graphical models include rules (e.g., data filters) in the data source query. For example, query 806 includes data filters that require a competency in cloud platform and a competency level of gold. Queries 808 and 810 includes data filters that require certain skills. It should be understood that additional rules may be provided in a rule query which is applied to data sets generated from executing the data source queries shown in FIG. 8A.

Figure 8B:
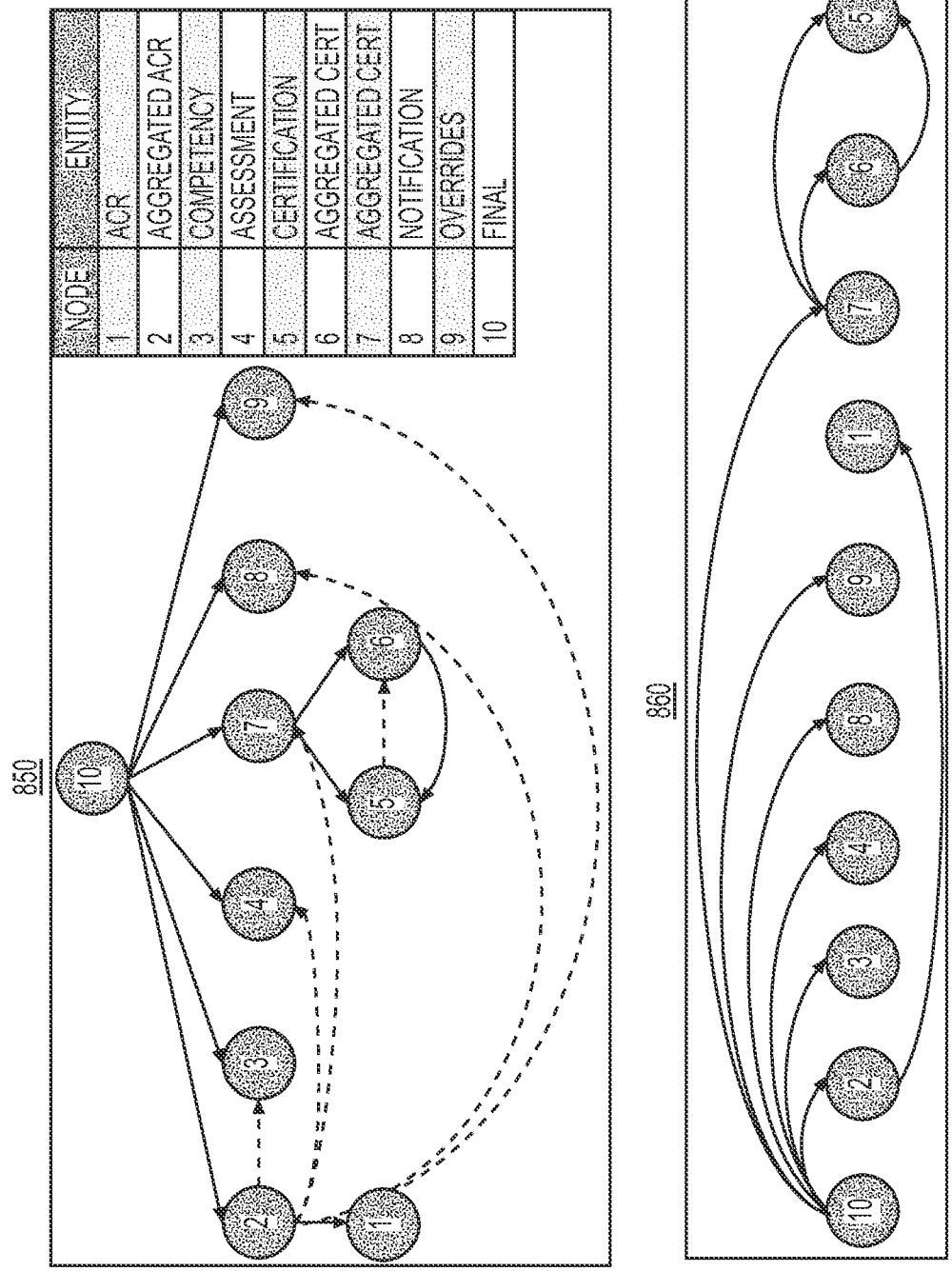
FIG. 8B shows an overall DAG that represents the JavaScript Object Notation (JSON) scripts generated per user input and an example ordering of nodes in accordance with the examples disclosed herein.

FIG. 8B shows a DAG 850 generated from a data source script that is created from user input received via the rules workbench UI 110. 860 shows a topological sorting of the nodes in accordance with the examples disclosed herein. By way of example, the input for generating the DAG 850 is a JSON script. Each JSON script for generating a data source query may have an id, an array of data sources, an array of relationships between the vertices, and an array of join and/or union criteria between the vertices at the same level. The DAG 850 not only includes the various nodes but also the relationships between the different nodes generated per one or more of the metadata included in tables 700 and the user input received via the rules workbench UI 110. For example, in the DAG 850, the arrows from nodes 2 to 3, 4, 7, 8, and 9 can represent table joins generated from table metadata and user input while the arrows from node 10 to each of the nodes 2, 3, 4, 7, 8, and 9 represent relationships that are automatically generated based on the user input and the script generated therefrom. The nodes in the DAG 850 are sorted as shown in 860, and the nodes are traversed starting at the leaf nodes until the root node 10 is reached. SQL statements are generated from traversing the nodes, and once the root node 10 is reached, the final SQL query is completed. The rules qualifying a partner are applied to the data output generated by executing the final SQL query.

Figure 9:
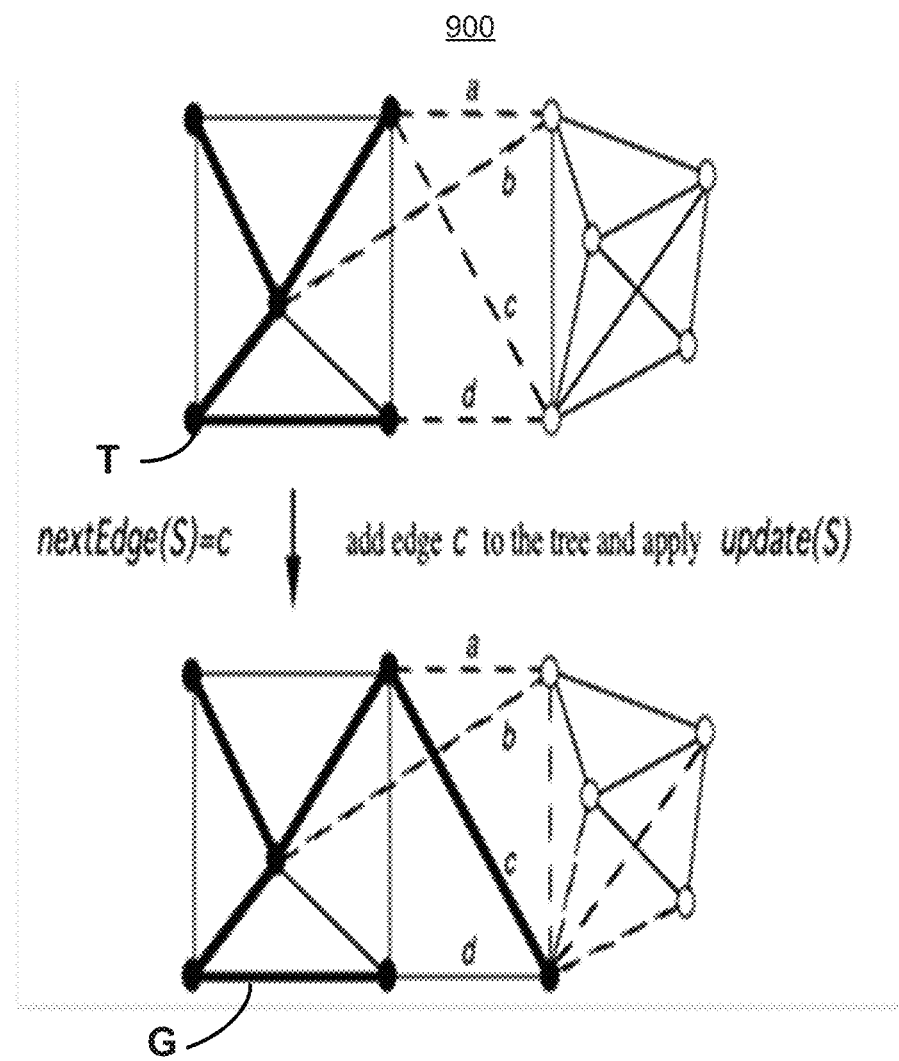
FIG. 9 shows a spanning tree generated using the overall DAG in accordance with the examples disclosed herein.

FIG. 9 shows a spanning tree 900 generated in accordance with the examples disclosed herein. Upon building the DAG 850 and the topological sorting of the nodes, the spanning tree 900 is grown for the DAG 850. A spanning tree for a graph G(V, E) is a sub-graph with (v−1) edges and visits every vertex in the graph. For a given tree T in a graph G, the edges and vertices of T are called tree edges and tree vertices while the edges and vertices not in T are called non-tree edges and non-tree vertices. Further, a frontier edge for a given tree T is a non-tree edge with one endpoint in T called its tree endpoint and another endpoint not in T called its non-tree endpoint. For the spanning tree 900, the tree edges of the tree T are shown in bold, the tree vertices are black and the non-tree vertices are white. The frontier edges for T appearing in dashed lines are edges a, b, c and d. Then the subgraph of G formed by adding edge c to tree T is a tree. It may be noted that as we add c to the tree, the set of eligible frontier edges need to be updated via a tree-growing process the steps of which are detailed below:

Input: Connected Graph G=(V,E), starting vertex v
Output: Spanning tree T
1. Initialize tree T as vertex v;
2. Initialize S as a set of proper edges incident on v
3. While s is not Empty
4. Let e=nextEdge and w be the non-tree endpoint
5. If w is not visited
6. Add v and w to T
7. Add edges incident on w to S
8. Mark w as visited
9. Return T The spanning tree generation as detailed above returns an edge whose tree endpoint was discovered earliest (least recently). The vertex discovery has to 'fan out' from the start vertex yielding the shortest path length from the start vertex to every other vertex in the graph to yield a tree similar to the DAG 850. The nodes can be traversed bottoms-up while the nodes at the same level can be connected by creating a sub-graph for the nodes at the same level and then executing a topological sort to determine the order of evaluation.

FIG. 10A shows an example snippet 1000 of a JSON script that is provided as input for the DAG processing. The JSON script 1000 is a data source script used to generate a data source query. The JSON script 1000 includes an id 1002, an array of data sources 1004, an array of relationships 1006 between the vertices, and an array of join criteria 1008 between the vertices at the same level. The details of each of the data sources 1004, the relationships 1006, and the joins/unions 1008 are provided in the tabular forms herein.

FIG. 10B shows an example JSON snippet 1050 with rules. The JSON script 1050 is a rule script used to generate a rule query. The JSON script 1050 includes rules provided via the rules workbench UI 110. An advantage of splitting up the data source query generation and the rule query generation and application process is to ensure higher performance when only the threshold values for rules are being changed by the user. Secondly, this separation ensures that applications can take advantage of either or both the steps. Rule sets are inherently hierarchical. At the lowest level, there are individual rules. Referring to the partner membership program example, a partner needs to be evaluated on each of these rules. Storing the results of the evaluation individually allows the rules workbench UI 110 to report detailed evaluation results to the partner and the gap to bridge if they are to qualify for a particular rule. For example, the JSON script 1050 includes individual rules or conditions 1052 to be satisfied by each entity being validated/selected for a program, e.g., each partner being selected for a competency program. The overall rule 1054 combines the individual rules in a generic expression tree to assess the entities as a result set, e.g., the partners' qualification for the program. The expressions for each rule can be any valid query statement comprising logical and arithmetic operators without writing any additional code. If the rule expression includes custom functions, then the custom functions can be implemented directly at the data store layer. The automatic rule generation and evaluation system 100 when implemented in the realm of partner services, therefore, has the capability of providing rich metrics on the number of partners qualified under an individual rule both at an aggregate level and each partner level. This helps the partners to track how far they are from achieving the next milestone for their competencies or advanced specializations. Below are some example characteristics of conditions and rules that can be generated by the automatic rule generation and evaluation system 100.

| Condition: Encodes a specific expression and persists the results after evaluation. | | |
|---|---|---|
| Element | Required | Description |
| Name | Y | Unique name provided for this condition |
| Expression | Y | Algebraic expression comprising of logical and arithmetic operators resulting in a Boolean value. |
| ValueIfTrue | Y | Value to store in the DB if the expression evaluates to true |
| ValueIfFalse | Y | Value to store in the DB if the expression evaluates to false |

| -continued | | |
|---|---|---|
| Condition: Encodes a specific expression and persists the results after evaluation. | | |
| Element | Required | Description |
| StoreAs | Y | The column name under which the results will be stored |

| Rules: Container for all the conditions | | |
|---|---|---|
| Element | Required | Description |
| Name | Y | Unique name provided for this condition |
| Conditions | Y | Collection of conditions that make up the individual ruleset |

FIGS. 11A-B show further examples of a portion of a data source script 1100 and a portion of a data source query 1150 generated from the data source script 1100. The data source script 1100 shown in FIG. 11A is a JSON script generated based on user input. For example, the user selects data sources, such as tables and/or columns from tables, and information for the selected tables and columns is populated in section 1101. The information may include data source id, location, table name, row filters, etc. Based on the selected data sources, relations are determined and populated in section 1102. The relations may be predetermined for various tables. For example, the relations may be a one-to-one between tables that include selected columns, e.g., each record in table 8 relates to one, and only one, record in table 3. The tables may be related through a primary key and a foreign key, and the tables may need to be aggregated to obtain the desired data. Section 1103 shows examples of joins and unions. An inner join returns records that have matching values in both tables. A left outer join returns all records from the left table, and the matched records from the right table. The union combines rows from selected tables. The system determines whether to use joins or unions to combine data from tables based on the user input. For example, if the user input requires matching rows between two tables then an inner join is generated in the script. A left outer join may be used to combine columns even if some of the data is missing from matching rows.

FIG. 11B shows a portion of a data source query 1150 generated from the data source script 1100. Generally, a DAG is represented by sections 1102 and 1103 of the data source script 1100. The DAG is sorted and traversed as is discussed above. As each layer of the DAG is traversed, a corresponding SQL statement is generated, which concludes in generating the data source query 1150.

Figure 12:
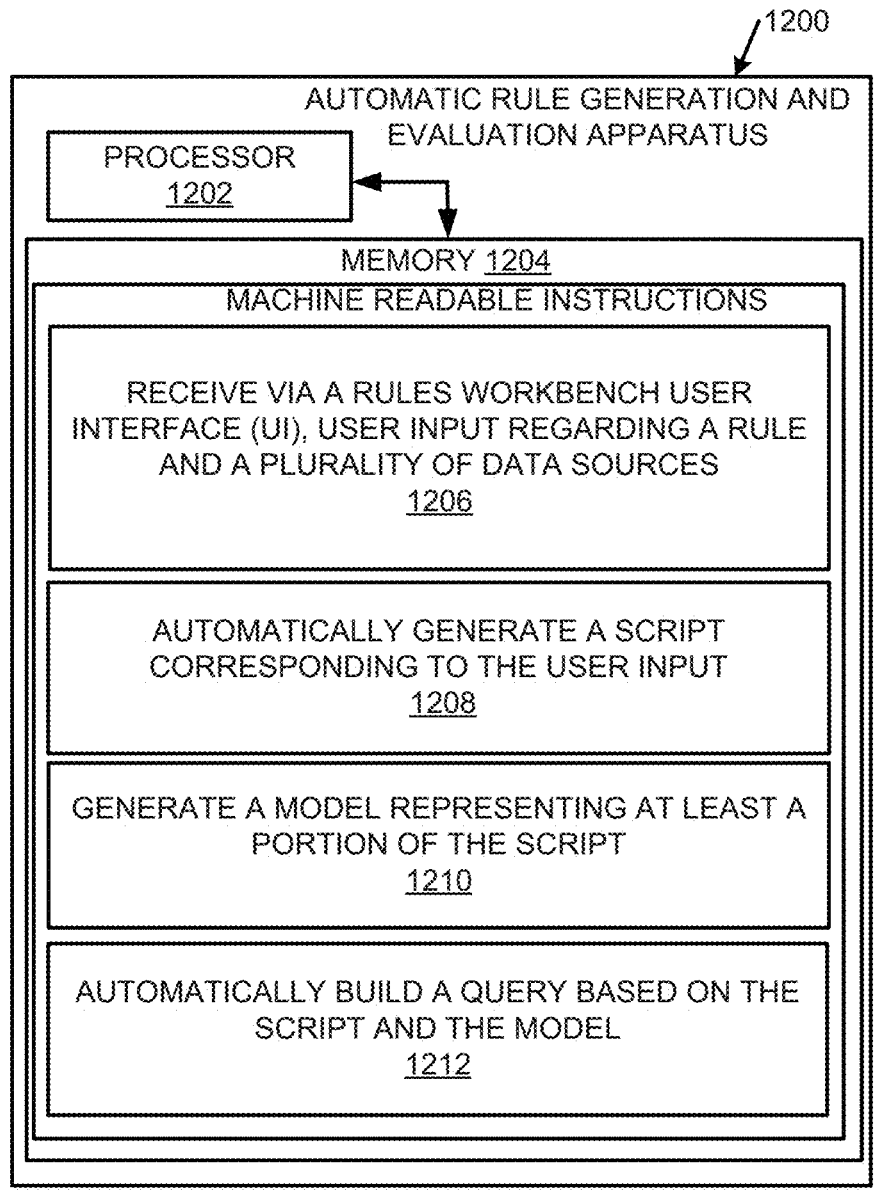
FIG. 12 shows machine-readable instructions for scalable rule evaluation in accordance with the examples disclosed herein.

FIGS. 12-14 respectively illustrate, an example block diagram 1200, a flowchart of an example method 1300, and a further example block diagram 1400 for automatic rule generation and evaluation, according to examples. The block diagram 1200, the method 1300, and the block diagram 1400 may be implemented in the automatic rule generation and evaluation system 100 described above with reference to FIG. 1 by way of example and not of limitation. The block diagram 1200, the method 1300, and the block diagram 1400 may be practiced in other apparatus.

In addition to showing the block diagram 1200, FIG. 12 shows the hardware for the scalable rule generation and evaluation system 100 that may execute the instructions of the block diagram 1200. The hardware may include a processor 1202, and a memory 1204 storing machine-readable instructions that when executed by the processor 1202 cause the processor to perform the instructions of block diagram 1200. The memory 1204 may represent a non-transitory computer-readable medium. FIG. 14 may represent a non-transitory computer-readable medium 1404 (or the data store 170) having stored thereon machine-readable instructions to provide for the rule generation and evaluation according to an example. The machine-readable instructions, when executed, cause a processor 1402 to perform the instructions of block diagram 1400 also shown in FIG. 14.

The processor 1202 of FIG. 12 and/or the processor 1402 of FIG. 14 may include a single or multiple processors or other hardware processing circuit, to execute the methods, functions, and other processes described herein. These methods, functions, and other processes may be embodied as machine-readable instructions stored on a computer-readable medium, which may be non-transitory (e.g., the non-transitory computer-readable medium 1404 of FIG. 14), such as hardware storage devices (e.g., RAM (random access memory), ROM (read-only memory), EPROM (erasable, programmable ROM), EEPROM (electrically erasable, programmable ROM), hard drives, and flash memory). The memory 1204 may include a RAM, where the machine-readable instructions and data for a processor may reside during runtime.

Referring to the block diagram 1200 shown in FIG. 12, the memory 1204 may include instructions 1206 that cause the processor 1202 to receive via the rules workbench UI 110, the user input 192 to implemented in software, whereby the user input specifies a rule and a plurality of data sources for applying the rule. For example, the rule may be pertaining to conditions for a partner membership program that is to be coded in the partner evaluation software and the plurality of data sources may be tables or columns of tables pertaining to the conditions and partner requirements.

The processor 1202 may fetch, decode, and execute the instructions 1208 to automatically generate the script 122 corresponding to the user input 192. The script 122 may include a rule script and a data source script as is discussed above. In an example, a script template may be populated with conditions of the rule received via the the rules workbench UI 110 to generate the rule script, and the data source script may be populated based on selected data sources, metadata for the selected data sources, predetermined relations between the data sources, and user input that represents how the data sources are to be combined, such as through joins or unions.

The processor 1202 may fetch, decode, and execute the instructions 1210 to generate a model representing at least a portion of the script 122. For example, a DAG is generated from the data source script.

The processor 1202 may fetch, decode, and execute the instructions 1212 to automatically build a query, such as a data source query and a rule query. The rule query may be populated with conditions and thresholds that are in the rule script. The data source query is generated from the data source script as is discussed above.

FIG. 13 may represent an example method for rule evaluation and the steps of the method. At block 1302, the method includes receiving via the rules workbench UI 110, the user input 192 regarding a rule pertaining and a plurality of data sources 120.

At block 1304, the method includes automatically generating the script 122 corresponding to the user input 192, which may include a rule script and a data source script.

At block 1306, the method includes generating a model, such as graphical model 142, representing the script 122. For example, a DAG is represented in the data source script.

At block 1308, the method includes generating a data source query from the model.

At 1310, the method includes executing the data source query to generate a data set.

At 1312, the method includes generating a rule query from the rule script. Conditions from the rule script may be populated in the rule query.

At 1314, the method includes executing the rule query on the data set generated at 1310.

At 1316, the method includes outputting a result set comprised of results of executing the rule query on the data set. The result set may be displayed on a UI of the rules workbench UI 110.

Referring to FIG. 14 particularly and the block diagram 1400, the non-transitory computer-readable medium 1404 may include instructions 1406 which the processor 1402 may fetch, decode, and execute to receive via the rules workbench UI 110, user input regarding an update to a rule and a plurality of data sources. In an example, the update may be a changed condition for meeting a partner requirement in a partner membership program.

The processor 1402 may fetch, decode, and execute the instructions 1408 to automatically generate the script 122, such as a rule script and a data source script, corresponding to the user input 192.

The processor 1402 may fetch, decode, and execute the instructions 1410 to generate a model, such as the graphical model 142, representing the script 122, such as the data source script.

The processor 1402 may fetch, decode, and execute the instructions 1412 to automatically build the queries 162 from the model and the script. For example, a data source query is built by sorting and traversing the model, and a rule query is built from the rule script.

The processor 1402 may fetch, decode, and execute the instructions 1414 to output the result set 164 obtained by executing the queries 162. For example, the data source query is executed to generate a data set by aggregating the plurality of data sources based on user input, and the rule query is executed on the data set to generate the result set 164, which may be displayed on a UI of the rules workbench UI 110.

FIGS. 15-19 show the various I/O screens or UIs of the rules workbench UI 110 that are provided by the automatic rule generation and evaluation system 100 in accordance with the examples disclosed herein. In particular, FIG. 15 shows a program UI 1500 that displays a list of existing programs 1502 in addition to providing a new program UI element 1504 that enables the user to add new partner membership programs. Activation of the new program UI element 1504 or selection of one of the programs from the list of existing programs 1502 may trigger the automatic rule generation and evaluation system 100 to execute a process as detailed above in FIG. 12.

FIG. 16 shows a program configuration screen 1600 provided in accordance with the examples disclosed herein. The program configuration screen 1600 enables the user to enter requirements associated with a role/category 1602. Various assessments can be selected via the drop-down box 1604 which can be populated with choices from one of the plurality of data sources 120. The program configuration screen 1600 also permits the selection of a relation type 1606 via another drop-down box so that more than one assessment can associated with a given role. Therefore, multiple qualifications either singly or plurally can be associated with the given role. To add plural assessments, an assessment can be selected from the drop-down box 1604 with a relation type 1606 'and' along with the add button 1608 which can display another drop-down box populated with the choices from the drop-down box 1604 to permit plural selections.

FIG. 17 shows a results UI 1700 that not only allows the user to configure requirements (i.e., rules) for a program but also provides the results 1702 that are generated from the user input as detailed above. For example, the results 1702 show that 53,481 partners are qualified per the current eligibility criteria. If the user 190 is satisfied with this result, the user 190 may finalize the rules for use on the competency platform. However, if the user is not satisfied, the user can provide further input to generate another intermediate result set which may be finalized depending on the user's satisfaction or which may be further altered via the generation of new rules to be applied to the data.

FIG. 18 shows a rules evaluation UI 1800 that not only allows the user to configure requirements such as a UI element 1802 for selecting existing data sources/adding data sources but also includes rule-modifying elements such as a threshold selector 1804, etc. For a given program, the rules evaluation UI 1800 not only provides the initial results 1702 but also provides the results 1806 generated by applying new rules on the data from the data sources selected using the UI element 1802. For example, a rule regarding a threshold to be applied can be automatically generated by selecting a threshold by moving the threshold selector 1804. A SQL query corresponding to the threshold rule is automatically generated as detailed herein and applied to the data from the selected data source thereby producing the results 1806. Therefore, the rules evaluation UI 1800 displays result sets obtained by applying two different rules to the data from the selected data sources.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An apparatus, comprising: a processor; and a computer-readable medium on which is stored machine-readable instructions that cause the processor to: receive via a user interface (UI), user input regarding a rule and a plurality of data sources; automatically generate a script from the user input, wherein the script includes at least an identification of the plurality of data sources and an array of relationships between the plurality of data sources, wherein the array of relationships between the plurality of data sources are formed, based at least on one of reference keys and an array of one or more of join and union criteria; automatically generate a model representing at least a portion of the script by: representing the plurality of data sources as nodes in the model, generating edges between the nodes that represent the array of relationships between the plurality of data sources, wherein the edges are generated based at least on one of the join criteria and the union criteria between at least two of the plurality of data sources; and automatically build a query based on the script and the model, wherein the query includes the rule.

2. The apparatus of claim 1, wherein the processor is to further: generate a dataset by combining the plurality of data sources based on the query; execute the query to apply the rule to the dataset; and display, via the UI, results of the applying the rule to the dataset.

3. The apparatus of claim 2, wherein the processor is to further: determine changes to the rule based on further user input received via the UI in response to displaying the results of the application of the rule to the dataset.

4. The apparatus of claim 3, wherein the processor is to further: automatically generate a further script corresponding to the further user input; generate a further model representing at least a portion of the further script; automatically build a further query based on the further script and the further model; execute the further query; display, via the UI, results of the executing the further query; determine based on additional user input received via the UI responsive to displaying the results of the executing the further query that no further changes to the changed rule are required; and save the changed rule as a finalized rule based on the additional user input.

5. The apparatus of claim 2, wherein the processor is to further: enable user selection of the plurality of data sources via the UI.

6. The apparatus of claim 5, wherein to automatically generate the script the processor is to further: include in the script, an identification of the plurality of data sources, the array of relationships between the plurality of data sources, and at least one of the join and union criteria for combining at least two of the plurality of data sources.

7. The apparatus of claim 6, wherein the model includes a Directed Acyclic Graph (DAG).

8. The apparatus of claim 7, wherein to generate the model including the DAG the processor is to: represent the plurality of data sources as the nodes in the DAG; and represent the array of relationships between the plurality of data sources, and the at least one of join and union criteria for combining at least two of the plurality of data sources as the edges between the nodes of the DAG.

9. The apparatus of claim 8, wherein to automatically build the query based on the script and the model the processor is to: sequentially process each layer of the DAG by: topologically sorting the nodes; identifying at least one of the joins and unions, and at least one of the array of relationships based on the edges between the sorted nodes; and creating the query based on the storing and the identifying.

10. The apparatus of claim 1, wherein the script comprises a Javascript Object Notation (JSON) script.

11. A computer-implemented method of automatic query generation that is executable by a processor, the method comprising: receiving, via a user interface (UI), a user input related to a rule and identification of a plurality of data sources for applying the rule; generating a rule script according to the rule; automatically generating a data source script according to the user input; automatically generating a model from the data source script by,—representing the plurality of data sources as nodes in the model, and generating edges between the nodes to represent an array of relationships between the plurality of data sources, wherein the edges are formed based on an array of one or more of join and union criteria between at least two of the plurality of data sources; automatically generating a data source query from the model; executing the data source query to generate a data set; automatically generating a rule query from the rule script; executing the rule query on the dataset; and outputting a result set of the rule query execution via the UI.

12. The method of claim 11, further comprising: receiving further user input regarding one of finalizing the rule and effecting further changes to the rule.

13. The method of claim 12, further comprising: based on the further user input indicating to finalize the rule, storing as a finalized rule, the rule that provided the result set as output.

14. The method of claim 12, further comprising: based on the further user input indicating to effect further changes to the rule, generating a further data source query and a further rule query based on the further user input, and executing the further data source query and the further rule query to generate a further result set.

15. The method of claim 12, wherein the model comprises a Directed Acyclic Graph (DAG), and the generating the data source query further comprises: represent the plurality of data sources as the nodes in the DAG; represent the array of relationships between the plurality of data sources, and the one or more of the join and union criteria for combining at least two of the plurality of data sources as the edges between the nodes; sorting the DAG: and traversing the DAG from leaf nodes to a root node and determining query statements for the data source query as the DAG is traversed.

16. A non-transitory computer-readable medium on which is stored machine-readable instructions that when executed by a processor, cause the processor to: receive via a user interface (UI), user input regarding updates to a rule pertaining to data stored in a plurality of data sources; automatically generate a script from the user input, wherein the script includes at least an identification of the plurality of data sources and an array of relationships between the plurality of data sources, wherein the array of relationships between the plurality of data sources are formed, based at least on one of reference keys and an array of one or more of join and union criteria; automatically generate a model from the script by representing the plurality of data sources are represented as nodes in the model, generating edges between the nodes that represent the array of relationships between the plurality of data sources, wherein the edges are formed based on an array of one or more of join and union criteria between at least two of the plurality of data sources, and directions of one or more of the edges are based at least on one of metadata of corresponding data sources from the plurality of data sources being connected by the one or more edges and the user input regarding the rule; automatically generate queries from the model and the script, wherein the queries include a rule query including the updates to the rule, and a data source query for aggregating the plurality of data sources according to the user input; and output a result set obtained by executing the queries.

17. The non-transitory computer-readable medium according to claim 16, wherein to execute the queries, the instructions, when executed by the processor, further cause the processor to: execute the data source query to generate a data set; and execute the rule query on the data set to generate the result set.

18. The non-transitory computer-readable medium according to claim 17, wherein the model comprises a Directed Acyclic Graph (DAG), and the DAG includes the plurality of data sources as the nodes, and the array of relationships between the plurality of data sources as the edges between the nodes wherein to generate the data source query, the instructions, when executed by the processor, further cause the processor to: sort the DAG; and traverse the DAG from leaf nodes to a root node and determine query statements for the data source query as the DAG is traversed.

19. The apparatus of claim 1, wherein to automatically generate the model the processor is to further: obtain specific keywords by parsing the script; identify of the plurality of data sources from the script using the specific keywords; and determine incoming and outgoing edges from each of the nodes by using classifiers trained to identify the specific keywords.

20. The apparatus of claim 1, wherein to generate the model representing at least the portion of the script the processor is to further: determine directions of one or more of the edges based at least on one of metadata of corresponding data sources from the plurality of data sources being connected by the one or more edges and the user input regarding the rule.

* * * * *